US010678121B2

(12) United States Patent
Nakamura et al.

(10) Patent No.: US 10,678,121 B2
(45) Date of Patent: Jun. 9, 2020

(54) PROJECTOR WITH DETACHABLE COOLING

(71) Applicant: SEIKO EPSON CORPORATION, Tokyo (JP)

(72) Inventors: Kentaro Nakamura, Shiojiri (JP); Kaname Nagatani, Matsumoto (JP); Takahiro Miyata, Matsumoto (JP); Toshizo Nishi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/162,457

(22) Filed: Oct. 17, 2018

(65) Prior Publication Data

US 2019/0116343 A1 Apr. 18, 2019

(30) Foreign Application Priority Data

Oct. 18, 2017 (JP) .................................. 2017-202023

(51) Int. Cl.
*G03B 21/16* (2006.01)
*H04N 9/31* (2006.01)
*F25B 21/02* (2006.01)
*G03B 21/20* (2006.01)

(52) U.S. Cl.
CPC ........... *G03B 21/16* (2013.01); *H04N 9/3144* (2013.01); *H04N 9/3158* (2013.01); *H04N 9/3164* (2013.01); *F25B 21/02* (2013.01); *F25B 2321/0252* (2013.01); *G03B 21/2033* (2013.01)

(58) Field of Classification Search
CPC .. H04N 9/3144; H04N 9/3158; H04N 9/3164; G03B 21/16; G03B 21/2033; F25B 21/02; F25B 2321/0252
See application file for complete search history.

(56) References Cited

U.S. PATENT DOCUMENTS

| 7,535,543 | B2 | 5/2009 | Dewa et al. |
| 7,993,009 | B2 * | 8/2011 | Tsuchiya ........... G02F 1/133385 |
| | | | 165/104.11 |
| 8,794,767 | B2 | 8/2014 | Yanagisawa et al. |
| 2002/0191159 | A1 * | 12/2002 | Nagao .................. H04N 9/3105 |
| | | | 353/54 |

(Continued)

FOREIGN PATENT DOCUMENTS

| JP | 2006-171300 A | 6/2006 |
| JP | 2008-089917 A | 4/2008 |
| JP | 2013-164595 A | 8/2013 |

*Primary Examiner* — Cara E Rakowski
*Assistant Examiner* — Magda Cruz
(74) *Attorney, Agent, or Firm* — Oliff PLC

(57) ABSTRACT

A projector includes a light source unit having a light source and a first cooling section adapted to transmit heat of the light source to a first liquid refrigerant circulating, an optical unit having a light modulation device and a second cooling section adapted to transmit heat of the light modulation device to a second liquid refrigerant, a cooling unit adapted to cool the first liquid refrigerant and the second liquid refrigerant, a first connection member connecting the light source unit and the cooling unit to each other, and a second connection member connecting the optical unit and the cooling unit to each other, and at least one of a set of the light source unit and the cooling unit, and a set of the optical unit and the cooling unit is configured to detachably be attached to each other.

9 Claims, 8 Drawing Sheets

(56) References Cited

U.S. PATENT DOCUMENTS

| | | |
|---|---|---|
| 2006/0125998 A1 | 6/2006 | Dewa et al. |
| 2009/0237619 A1 | 9/2009 | Yanagisawa et al. |
| 2010/0045940 A1* | 2/2010 | Takagi .................. G03B 21/16 353/54 |
| 2016/0301901 A1* | 10/2016 | Ishii ..................... H04N 9/3144 |
| 2016/0353067 A1* | 12/2016 | Kadotani ............... G03B 21/16 |
| 2018/0066835 A1* | 3/2018 | Kobayashi ................ F21V 9/40 |

\* cited by examiner

PROJECTOR WITH DETACHABLE COOLING

BACKGROUND

1. Technical Field

The present invention relates to a projector.

2. Related Art

In the past, there has been known a projector provided with a light source device, a light modulation device for modulating the light emitted from the light source device to thereby form an image corresponding to image information, and a projection optical device for projecting the image thus formed on a target projection surface such as a screen in an enlarged manner.

As such a projector, there is known a projector provided with a cooling device for circulating a liquid refrigerant to thereby cool a cooling target (see, e.g., JP-A-2008-89917 (Document 1) and JP-A-2006-171300 (Document 2)).

The projector (a projection type video display device) described in Document 1 is provided with a red LED, a green LED and a blue LED each functioning as a light source, and a cooler for cooling these LED. Among these constituents, the cooler is provided with a heat conducting section coupled to each of the LED, a radiator, and a pump for circulating the liquid refrigerant between the heat conducting section and the radiator. Then, the heat conducted from the LED to the liquid refrigerant in the heat conducting section is radiated in the radiator through which the liquid refrigerant is circulated, and thus, each of the LED is cooled.

A projector (a video display device) described in Document 2 is provided with a first liquid crystal display section for modulating a red component of light emitted from a light source, a second liquid crystal display section for modulating a green component of the light, a third liquid crystal display section for modulating a blue component of the light, and a cooling section. The cooling section has a pump, a heat radiator, and a reservoir tank. Among these constituents, the pump circulates the liquid refrigerant through the first liquid crystal display section, the second liquid crystal display section and the third liquid crystal display section in this order, and the liquid refrigerant supplied to the third liquid crystal display section is supplied to the heat radiator, and is then housed in the reservoir tank. Further, the liquid refrigerant housed in the reservoir tank is supplied by the pump once again to thereby be circulated through the cooling section, and thus, each of the liquid crystal display sections is cooled.

Incidentally, the constituents of the projector are different in progress of deterioration and life from each other, and there arises a necessity for replacing the constituent having outlived its usefulness.

However, in the configuration of each of the projectors described in Document 1 and Document 2, if it is attempted to replace the constituents of the cooling target or the cooling device, it is not achievable to easily detach these constituents, and there arises a necessity for detaching the whole of the cooling device together with the cooling target. Therefore, in the projector, there is a problem that the maintainability is low.

SUMMARY

An advantage of some aspects of the invention is to provide a projector capable of improving the maintainability.

A projector according to an aspect of the invention includes a light source unit having a light source adapted to emit light, and a first cooling section adapted to transmit heat of the light source to a first liquid refrigerant circulating inside the first cooling section to cool the light source, an optical unit having a light modulation device adapted to modulate the light emitted from the light source, and a second cooling section adapted to transmit heat of the light modulation device to a second liquid refrigerant circulating inside the second cooling section to cool the light modulation device, a cooling unit adapted to cool the first liquid refrigerant and the second liquid refrigerant, a first connection member which is adapted to connect the light source unit and the cooling unit to each other, and through which the first liquid refrigerant circulates, and a second connection member which is adapted to connect the optical unit and the cooling unit to each other, and through which the second liquid refrigerant circulates, wherein at least one of a set of the light source unit and the cooling unit, and a set of the optical unit and the cooling unit is configured to detachably be attached to each other.

According to such a configuration, in the case in which the light source unit and the cooling unit are configured so as to detachably be attached to each other, it is possible to detach the light source unit, and further, in the case in which the optical unit and the cooling unit are configured so as to detachably be attached to each other, it is possible to detach the optical unit. Further, in the case in which the light source unit and the cooling unit are configured so as to detachably be attached to each other, and the optical unit and the cooling unit are configured so as to detachably be attached to each other, it is possible to detach the cooling unit. Thus, in the case in which the necessity of replacement arises due to a failure of the like, it is possible to detach the unit as the replacement target. Therefore, it is possible to enhance the maintainability of the projector.

In the aspect of the invention described above, it is preferable that at least one of the first connection member and the second connection member includes a first connection section connected to one of the two units which are connected to each other with the at least one of the connection members, and a second connection section connected to the other of the two units, the second connection section detachably attached to the first connection section.

It should be noted that the first connection section and the second connection section can each be formed of, for example, a coupler.

According to such a configuration, for example, in the case in which the first connection section and the second connection section are located in the first connection member, by releasing the connection of the first connection section and the second connection section, it is possible to detach the light source unit from the cooling unit. Similarly, in the case in which the first connection section and the second connection section are located in the second connection member, it is possible to detach the optical unit from the cooling unit. Further, in the case in which the first connection section and the second connection section are located in each of the first connection member and the second connection member, it is possible to detach the cooling unit from the light source unit and the optical unit. Therefore, whichever one of the three units is the replacement target, it is possible to detach the target unit from the other units.

In the aspect of the invention described above, it is preferable that the at least one of the connection members has a plurality of sets of the first connection section and the second connection section, and a shape of the first connection section and a shape of the second connection section are different from each other.

According to such a configuration, after deciding so that, for example, the first connection section is located on the upstream side in the circulation direction of the liquid refrigerant, and the second connection section is located on the downstream side, by providing the first connection section and the second connection section, when detaching the unit as the replacement target and then attaching a new unit, it is possible to prevent the new unit from being attached in the opposite orientation. Therefore, misassembling of the units can be prevented.

In the aspect of the invention described above, it is preferable that the light source unit includes a light source section including the light source and the first cooling section, an optical element section having an optical element adapted to act on the light emitted from the light source, and a third cooling section adapted to transmit heat of the optical element to the first liquid refrigerant circulating inside the third cooling section to cool the optical element, and a third connection member which is adapted to connect the first cooling section and the third cooling section to each other, and through which the first liquid refrigerant circulates, and the light source section and the optical element section are configured to detachably be attached to each other.

It should be noted that as the optical element, an optical component acting on the light described above can be cited.

According to such a configuration, since it is possible to detach one of the constituents of the light source section and the optical element section from the other of the constituents thereof, it is possible to easily replace the one of the constituents. Therefore, it is possible to further enhance the maintainability of the projector.

In the aspect of the invention described above, it is preferable that the cooling unit has a radiator located upstream with respect to the optical element section in a flow channel of the first liquid refrigerant, the radiator adapted to radiate the heat of the first liquid refrigerant before circulating through the optical element section to cool the first liquid refrigerant.

According to such a configuration, it is possible to directly circulate the first liquid refrigerant having been cooled by the radiator through the optical element section. Therefore, it is possible to effectively cool the optical element.

In the aspect of the invention described above, it is preferable that the optical element is at least one of a wavelength conversion element adapted to convert wavelength of incident light, and a light diffusion element adapted to diffuse the incident light.

According to such a configuration, even in the case in which there arises the necessity of replacing the wavelength conversion element or the light diffusion element due to the deterioration or the like, it is possible to detach and then replace at least one of these constituents. Therefore, it is possible to further enhance the maintainability of the projector.

In the aspect of the invention described above, it is preferable that the cooling unit has a heat radiator adapted to radiate the heat of the first liquid refrigerant, and the heat radiator is thermally isolated from the light source and the light modulation device.

According to such a configuration, it is possible to prevent the heat radiated in the heat radiator from being transmitted to the light source and the light modulation device. Therefore, the rise in temperature of the light source and the light modulation device can be suppressed.

In the aspect of the invention described above, it is preferable that there is further included an exterior housing adapted to house the light source unit, the optical unit and the cooling unit inside, and the exterior housing has a partition wall disposed inside the exterior housing, the partition wall adapted to partition a first area and a second area from each other, the first area where the heat radiator is disposed and the second area where the light source and the light modulation device are disposed, the partition wall adapted to thermally isolate the first area from the second area.

According to such a configuration, since the first area is thermally isolated from the second area by the partition wall, it is possible to surely prevent the heat radiated by the heat radiator disposed in the first area from affecting the light source and the light modulation device disposed in the second area. Therefore, the rise in temperature of the light source and the light modulation device can surely be suppressed.

In the aspect of the invention described above, it is preferable that there is further included a cooling fan disposed inside the first area, the cooling fan adapted to circulate a cooling gas through the heat radiator, the exterior housing includes an introduction port adapted to introduce a gas outside of the exterior housing into the first area as the cooling gas, and a discharge port adapted to discharge the cooling gas having circulated through the heat radiator to the outside of the exterior housing.

According to such a configuration, it is possible to circulate the gas low in temperature through the heat radiator disposed in the first area as the cooling gas. Further, since the cooling gas having circulated through the heat radiator to be raised in temperature is discharged from the discharge port, it is possible to keep the temperature in the first area in a low level. Therefore, it is possible to increase the heat radiation efficiency due to the heat radiator, and it is possible to effectively cool the first liquid refrigerant using the heat radiator. Therefore, it is possible to more effectively cool the light source which is cooled by the first liquid refrigerant.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will hereinafter be described based on the accompanying drawings.

Schematic Configuration of Projector

Figure 1:
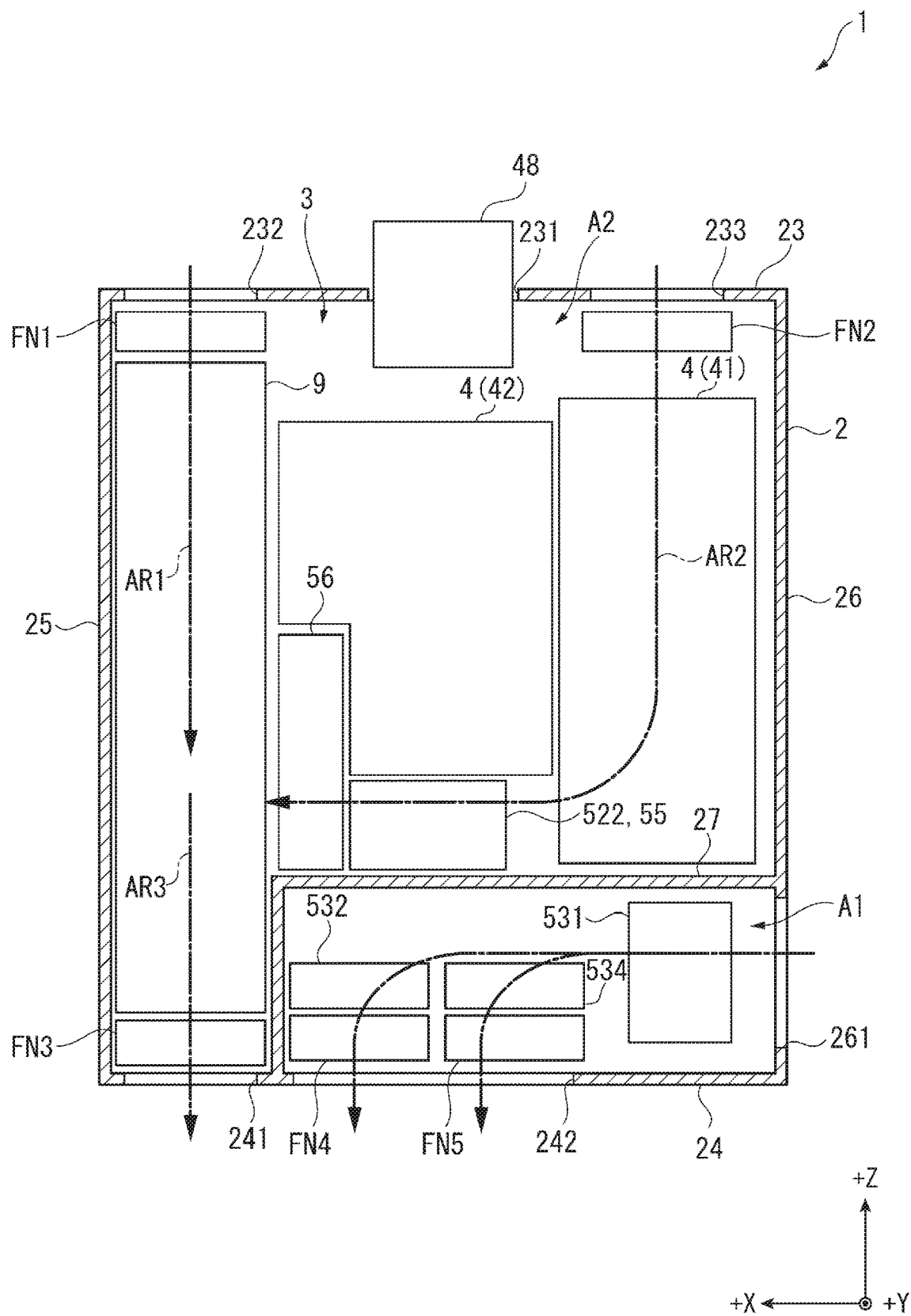
FIG. 1 is a schematic diagram showing a configuration of a projector according to a first embodiment of the invention.

FIG. 1 is a schematic diagram showing a configuration of a projector 1 according to the present embodiment.

The projector 1 according to the present embodiment is a projection type display device for modulating the light emitted from a light source device 41 to thereby form an image corresponding to image information, and then projecting the image on a projection target surface such as a screen in an enlarged manner. As shown in FIG. 1, the projector 1 is provided with an exterior housing 2 forming an exterior, and a device main body 3 housed in the exterior housing 2.

Although described later in detail, such a projector has one of the features in the configuration and the arrangement of a cooling device 5 for cooling a cooling target.

Hereinafter, a configuration of the projector 1 will be described in detail.

Configuration of Exterior Housing

The exterior housing 2 is formed to have a roughly rectangular solid shape. The exterior housing 2 has a front surface part 23, a back surface part 24, a right side surface part 25 (a side surface part located on the right side viewed from the front surface part 23 side), and a left side surface part 26 (a side surface part located on the left side viewed from the front surface part 23 side), and in addition has a top surface part for connecting one end side of these surface parts 23 through 26 and a bottom surface part for connecting the other end side of these surface parts 23 through 26, although not shown in the drawings. It should be noted that the bottom surface part is a surface opposed to an installation surface of the projector 1, and is provided with a plurality of legs.

The front surface part 23 has an opening section 231 for exposing apart of a projection optical device 48 described later, and an introduction ports 232, 233 located so as to be shifted toward the left side surface 26 and the right side surface 25, respectively, with respect to the opening section 231 and taking a gas located outside the exterior housing 2 inside as a cooling gas. Although not shown in the drawings, these introduction ports 232, 233 are each provided with an air filter for removing dust from the cooling gas to be taken in.

At a position closer to the back surface part 24, the left side surface part 26 has an introduction port 261 for introducing the gas located outside the exterior housing 2 inside as a cooling gas. It should be noted that in the present embodiment, the introduction port 261 is not provided with the air filter. This will be described later in detail.

The back surface part 24 has discharge ports 241, 242 for discharging the gas having circulated inside the exterior housing 2 to the outside of the exterior housing 2. Among these, the discharge port 241 is formed at a position located closer to the right side surface part 25 in the back surface part 24, and the discharge port 242 is formed at a position located closer to the left side surface part 26 than the discharge port 241.

Such an exterior housing 2 has a partition wall 27 for partitioning an area inside the exterior housing 2. The partition wall 27 is disposed at a position closer to the back surface part 24 in the exterior housing 2 so as to have a roughly L shape, and partitions a first area A1 inside the partition wall 27 in the exterior housing 2 and a second area A2 outside the partition wall 27 from each other to thermally isolate the first area A1 from the second area A2.

Further, the cooling gas introduced inside the first area A1 via the introduction port 261 is discharged from the discharge port 242.

Inside such a first area A1, there is disposed apart of the configuration of the cooling device 5 described later. This will be described later in detail.

It should be noted that in the following description, among a +Z direction, a +X direction and a +Y direction perpendicular to each other, the +Z direction is defined as a direction from the back surface part 24 toward the front surface part 23. Further, the +X direction is defined as a direction from the left side surface part 26 toward the right side surface part 25, and the +Y direction is defined as a direction from the bottom surface part toward the top surface part. In other words, the +Z direction is a direction from the lower side toward the upper side in the view shown in FIG. 1, the +X direction is a direction from the right side toward the left side, and the +Y direction is a direction from a back side toward the front side. Further, although not shown in the drawings, an opposite direction to the +Z direction is defined as a −Z direction. The same applies to a −Y direction and a −X direction. It should be noted that in the following description, the +Z direction, the +X direction and the +Y direction are defined as directions (perpendicular directions) perpendicular to each other.

Configuration of Device Main Body

The device main body 3 is an internal constituent housed in the exterior housing 2. The device main body 3 is provided with an image projection device 4, the cooling device 5, and a power supply device 9. Besides the above, although not shown in FIG. 1, the device main body 3 is provided with a control device for controlling an operation of the projector 1.

Among these constituents, the power supply device 9 is disposed at a position on the +X direction side along the right side surface section 25 in the exterior housing 2. The power supply device 9 transforms the voltage supplied from the outside to supply the result to each of electronic components constituting the projector 1.

Configuration of Image Projection Device

Figure 2:
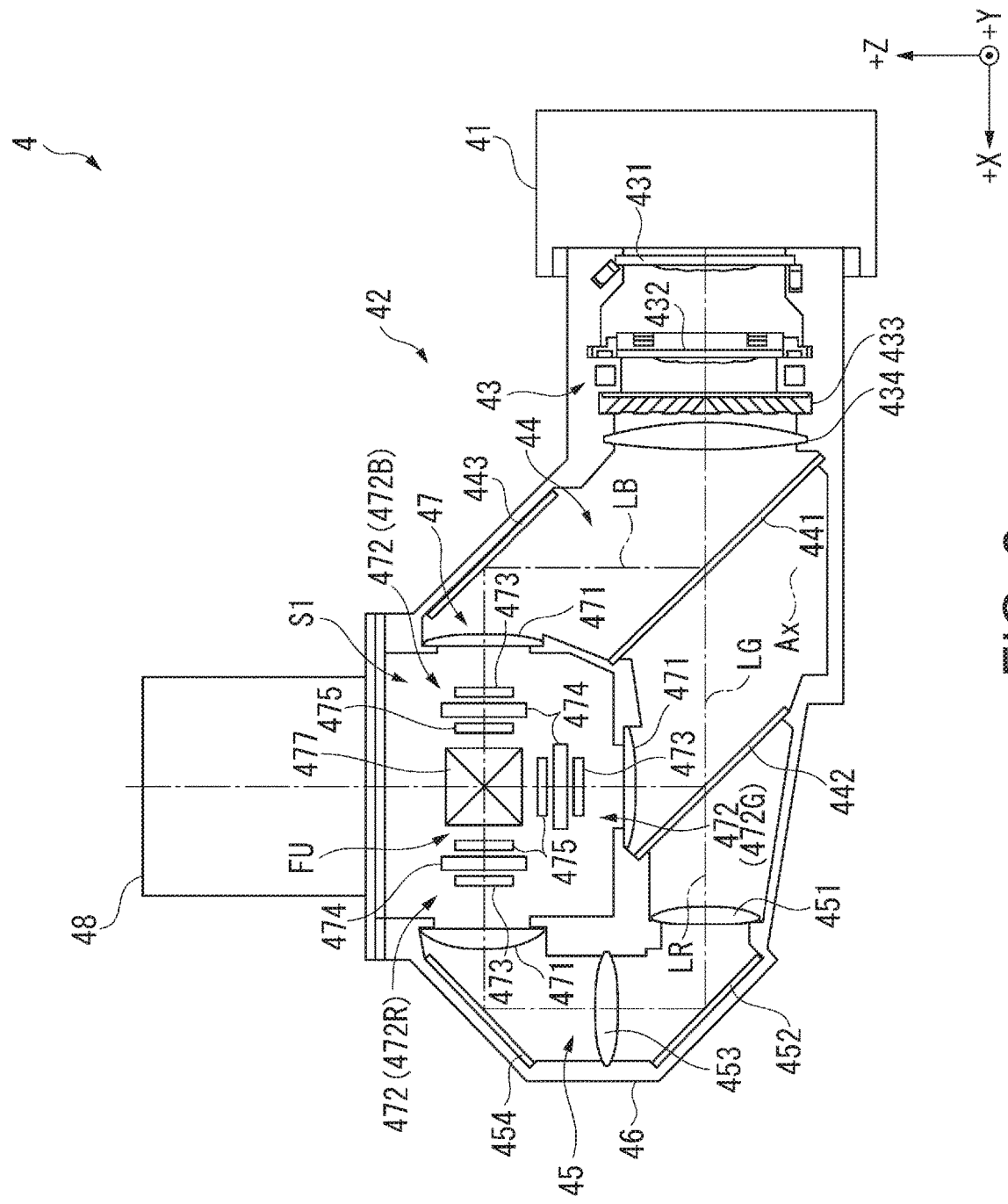
FIG. 2 is a schematic diagram showing a configuration of an image projection device in the first embodiment described above.

FIG. 2 is a schematic diagram showing a configuration of the image projection device 4.

The image projection device 4 is for forming and then projecting an image corresponding to image information input from the control device described above, and is disposed on the +Z direction side and the −X direction side in the exterior housing 2. As shown in FIG. 2, the image projection device 4 has a light source device 41, an image forming device 42 and a projection optical device 48. Further, the image forming device 42 has a homogenizing device 43, a color separation device 44, a relay device 45, an optical component housing 46 and an electrooptic device 47.

Among these constituents, the light source device 41 is for constituting a part of a light source unit UN1 described later, and is disposed along a left side surface part 26 (see FIG. 1) in a region located on the +Z direction side inside the exterior housing 2. Further, the image forming device 42 is for constituting a part of an optical unit UN2 described later. The image forming device 42 and the projection optical device 48 are disposed at roughly the center in the +X direction in a region located on the +Z direction side inside the exterior housing 2.

Configuration of Light Source Device

Figure 3:
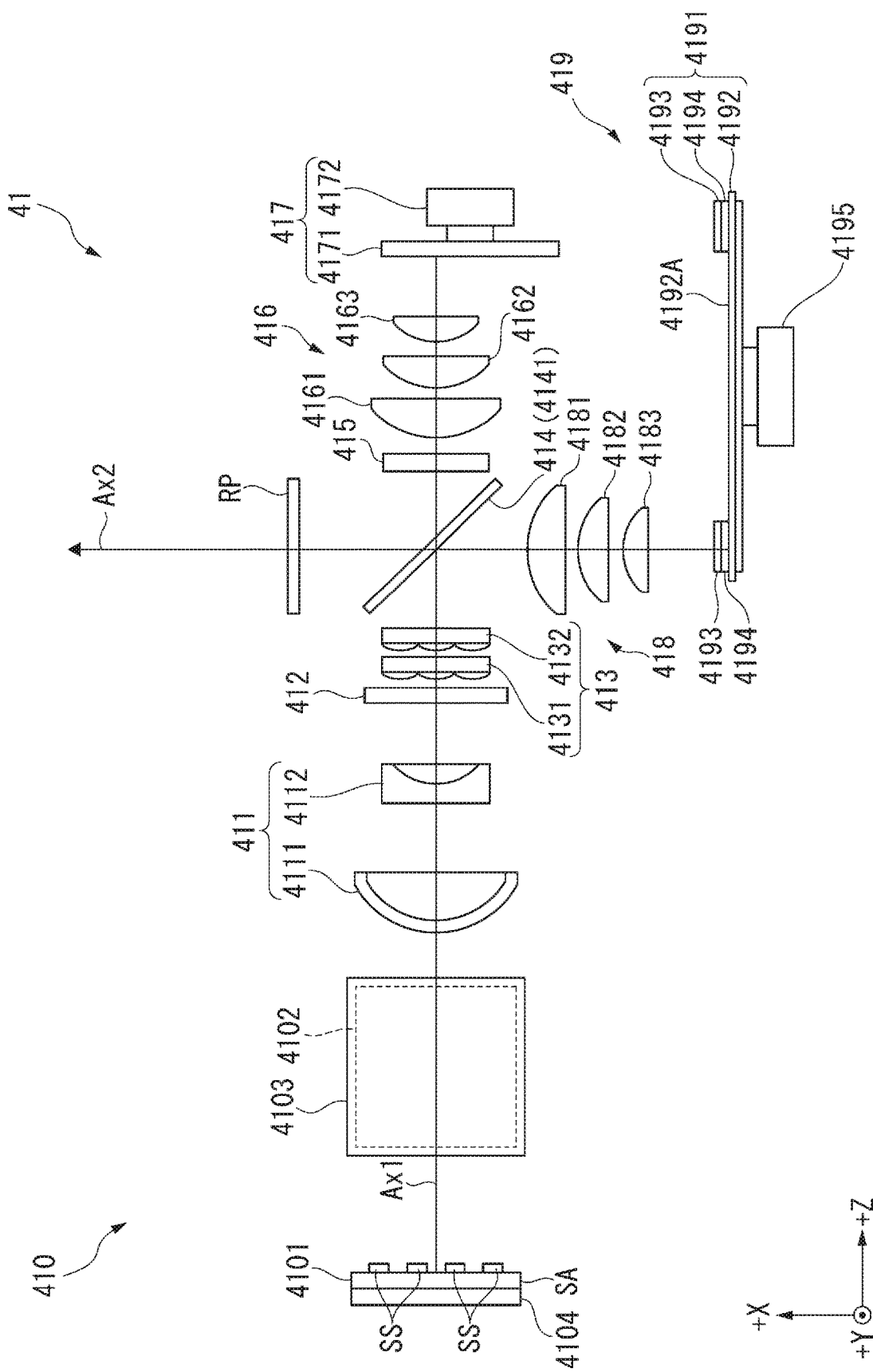
FIG. 3 is a schematic diagram showing a configuration of a light source device in the first embodiment described above.

FIG. 3 is a schematic diagram showing a configuration of the light source device 41.

The light source device 41 emits illumination light including the red light, the green light, and the blue light to the homogenizing device 43. As shown in FIG. 3, the light source device 41 is provided with a light source section 410, an afocal optical element 411, a first retardation element 412, a homogenizer optical element 413, a light combining element 414, a second retardation element 415, a first light collecting element 416, a light diffusion element 417, a second light collecting element 418, a wavelength conversion device 419 and a third retardation element RP.

Among these constituents, the light source section 410, the afocal optical element 411, the first retardation element 412, the homogenizer optical element 413, the second retardation element 415, the first light collecting element 416 and the light diffusion device 417 are disposed on a first illumination optical axis Ax1 set in the light source device 41. In contrast, the second light collecting element 418, the wavelength conversion device 419, the third retardation element RP and the homogenizing device 43 described later are disposed on a second illumination optical axis 2 similarly set to the power supply device 41, and crossing the first illumination optical axis Ax1. Further, the light combining element 414 is disposed in a crossing part between the first illumination light axis Ax1 and the second illumination optical axis Ax2.

Configuration of Light Source Section

The light source section 410 emits source light. The light source section 410 has a first light source 4101, a second light source 4102 and a light combining member 4103, and two light source cooling sections 4104.

The first light source 4101 is disposed along the X-Y plane, and emits the source light in the +Z direction. The first light source 4101 has a solid-state light source array SA and a collimating element (not shown) for collimating and reducing in diameter the blue light emitted from the solid-state light source array SA.

The solid-state light source array SA has a configuration having solid-state light sources SS as laser diodes (LD) arranged in a matrix. These solid-state light sources SS each emit the blue light having a peak wavelength of, for example, 440 nm as the source light, but can also emit blue light having a peak wavelength of 446 nm or blue light having a peak wavelength of 460 nm. The source light having been emitted from such a solid-state light source array SA is collimated by the collimating element, and then enters the light combining member 4103 along the +Z direction.

The second light source 4102 is disposed along the X-Z plane, and emits the source light in the +Y direction. Although not shown in detail, the second light source 4102 has a solid-state light source array SA and the collimating element similarly to the first light source 4101.

It should be noted that the solid-state light sources SS arranged in the solid-state light source array SA of the second light source 4102 each emit blue light having the same wavelength as the solid-state light source SS of the first light source 4101 described above as the source light. However, this is not a limitation, but it is also possible to dispose solid-state light sources respectively emitting blue light beams different in peak wavelength from each other so as to be mixed with each other in the first light source 4101 and the second light source 4102.

Further, in the present embodiment, the source light emitted from each of the solid-state light sources SS is s-polarized light, but the source light can also be p-polarized light. Further, it is also possible to adopt a configuration in which each of the light sources 4101, 4102 has the solid-state light source SS for emitting excitation light as the s-polarized light, and the solid-state light source SS for emitting excitation light as the p-polarized light. In this case, the first retardation element 412 described later can be omitted.

The light combining member 4103 combines the source light having been emitted from the first light source 4101 toward the +Z direction and the source light having been emitted from the second light source 4102 toward the +Y direction with each other, and then emits the result toward the +Z direction.

It should be noted that the light source section 410 can also have a configuration having only the first light source 4101, or can also have a configuration having a larger number of light sources. In the case in which the light source section 410 has only the first light source 4101, the light combining member 4103 can be omitted.

One of the two light source cooling sections 4104 is disposed on an opposite side to the light emission side of the solid-state light source array SA of the first light source 4101. Further, the other of the two light source cooling sections 4102 is disposed on an opposite side to the light emission side of the solid-state light source array SA of the second light source 4102. These light source cooling sections 4104 transmit the heat transmitted from corresponding one of the solid-state light source arrays SA to a third refrigerant RE3 (see FIG. 5) as the liquid refrigerant to thereby cool the solid-state light source array SA, and by extension, each of the solid-state light sources SS. Specifically, each of the light source cooling sections 4104 transmits the heat of the first light source 4101 and the second light source 4102 to the third refrigerant RE3 (first liquid refrigerant) circulating inside the respective light source cooling sections to thereby cool the first light source 4101 and the second light source 4102. These light source cooling sections 4104 correspond to the first cooling section. The third refrigerant RE3 circulating in such light source cooling sections 4104 will be described later in detail.

Configuration of Afocal Optical Element and First Phase Difference Element

The afocal optical element 411 has lenses 4111, 4112, reduces the diameter of the source light entering the afocal optical element 411 from the light source section 410, and then collimates and then emits the result.

The first retardation element 412 is a half-wave plate. Bypassing through the first retardation element 412, the source light as the s-polarized light entering the first retardation element 412 from the afocal optical element 411 is partially converted into the source light as the p-polarized light to thereby turn to the source light having the s-polarized light and the p-polarized light mixed with each other.

Configuration of Homogenizer Optical Element

The homogenizer optical element 413 has two multi-lenses 4131, 4132, and homogenizes the luminance distribution of the source light entering illumination target areas in the light diffusion device 417 and the wavelength conversion device 419. It should be noted that the homogenizer optical element 413 is not limited to be disposed on the light emission side of the first retardation element 412, but can also be disposed between the afocal optical element 411 and the first retardation element 412.

Configuration of Light Combining Element

The light combining element 414 has a polarization separation layer 4141 tilted about 45° with respect to each of the first illumination optical axis Ax1 and the second illumination optical axis Ax2.

The polarization separation layer 4141 has a property of separating the s-polarized light and the p-polarized light included in the source light entering the polarization separation layer 4141 via the homogenizer optical element 413 from each other, and in addition has a property of transmitting the fluorescence generated in the wavelength conversion device 419 irrespective of the polarization state of the fluorescence. In other words, the polarization separation layer 4141 has wavelength-selective polarization separation characteristics of separating the s-polarized light and the p-polarized light from each other with respect to the blue light while transmitting both of the s-polarized light and the p-polarized light with respect to the green light and the red light.

Out of the source light entering the light combining element 414 also functioning as a light separation element as described above from the homogenizer optical element 413, the p-polarized light is transmitted by the light combining element 414 toward the second retardation element 415 along the first illumination optical axis Ax1, and the s-polarized light is reflected by the light combining element 414 toward the second light collecting element 418 along the second illumination optical axis Ax2. Further, the light combining element 414 combines the source light entering the light combining element 414 via the second retardation element 415 and the fluorescence entering the light combining element 414 via the second light collecting element 418 with each other.

Configuration of Second Retardation Element and First Light Collecting Element

The second retardation element 415 is a quarter-wave plate, converts the source light as the p-polarized light entering the second retardation element 415 from the light combining element 414 into the source light as circularly polarized light, and converts the source light (circularly polarized light in the opposite rotational direction to that circularly polarized light) entering the second retardation element 415 from the first light collecting element 416 into the s-polarized light.

The first light collecting element 416 collects (converges) the source light having passed through the second retardation element 415 to the light diffusion device 417, and further, collimates the source light entering the first light collecting element 416 from the light diffusion device 417. The first light collecting element 416 is constituted by three lenses 4161 through 4163, but the number of lenses constituting the first light collecting element 416 is not limited to 3.

Configuration of Light Diffusion Device

The light diffusion device 417 has a light diffusion element 4171, and a rotating device 4172 for rotating the light diffusion element 4171.

Among these constituents, the light diffusion element 4171 is an optical element acting on the light emitted from the first light source 4101 and the second light source 4102, and more specifically, an optical element for diffusing the light having entered that optical element. The light diffusion element 4171 has a ring-like reflecting layer centered on the rotational axis by the rotating device 4172. The reflecting layer diffuses the source light entering the reflecting layer at substantially the same diffusion angle as the fluorescence generated in and emitted from the wavelength conversion device 419. Specifically, the reflecting layer performs the Lambert reflection on the incident light.

The source light having been diffusely reflected by such a light diffusion element 417 enters the second retardation element 415 once again via the first light collecting element 416. When being reflected by the light diffusion element 417, the circularly polarized light having entered the light diffusion element 4171 turns to the circularly polarized light in the opposite rotational direction, and is converted into the source light as the s-polarized light having the polarization direction rotated as much as 90° with respect to the source light as the p-polarized light passing through the light combining element 414 in the process of passing through the second retardation element 415. The source light as the s-polarized light is reflected by the polarization separation layer 4141 described above so as to be parallel to the second illumination light axis Ax2, and then enters the homogenizing device 43 described later as the blue light via the third retardation element RP.

Configuration of Second Light Collecting Element

The source light as the s-polarized light having passed through the homogenizer optical element 413 and then having been reflected by the polarization separation layer 4141 described above enters the second light collecting element 418. The second light collecting element 418 converges the source light entering the second light collecting element 418 to the illumination target area (a wavelength conversion layer 4193 described later) of the wavelength conversion device 419, and further, collimates the fluorescence entering the second light collecting element 418 from the wavelength conversion device 419. Similarly to the first light collecting element 416, the second light collecting element 418 is constituted by three lenses 4181 through 4183, but the number of lenses provided to the second light collecting element 418 is not limited to 3.

Configuration of Wavelength Conversion Device

The wavelength conversion device 419 has a wavelength conversion element 4191, and a rotating device 4195 for rotating the wavelength conversion element 4191.

The wavelength conversion element 4191 is an optical element acting on the light emitted from the first light source 4101 and the second light source 4102, and more specifically, an optical element for converting the wavelength of the light having entered that optical element. The wavelength conversion element 4191 has a support member 4192 having a disk-like shape, and a wavelength conversion layer 4193 and a reflecting layer 4194 located on a surface 4192A on the incident side of the source light in the support member 4192.

The wavelength conversion layer 4193 is a phosphor layer including a phosphor excited by the incidence of the source light described above to diffusely emit the fluorescence (the fluorescence having a peak wavelength in a wavelength band of, for example, 500 through 700 nm) as non-polarized light. In other words, the wavelength conversion layer 4193 performs the wavelength conversion on the blue light entering the wavelength conversion layer 4193 into the fluorescence. A part of the fluorescence generated in such a wavelength conversion layer 4193 is emitted toward the second light collecting element 418, and another part thereof is emitted toward the reflecting layer 4194.

The reflecting layer 4194 is disposed between the wavelength conversion layer 4193 and the support member 4192, and reflects the fluorescence entering the reflecting layer 4194 from the wavelength conversion layer 4193 toward the second light collecting element 418.

The fluorescence diffusely emitted from such a wavelength conversion element 4191 passes through the second light collecting element 418, the polarization separation layer 4141 and the third retardation element RP along the second illumination optical axis Ax2, and then enters the homogenizing device 43. Specifically, the fluorescence passes through the polarization separation layer 4141 to thereby be combined with the source light as the blue light having been reflected by the polarization separation layer 4141, and then enters the homogenizing device 43 via the third retardation element RP as the white illumination light.

Configuration of Third Retardation Element

The third retardation element RP is a half-wave plate, and converts the illumination light entering the third retardation element RP from the light combining element 414 into the circularly polarized light having the s-polarized light and the P-polarized light mixed with each other. The reason that such a third retardation element RP is provided is as follows. Since the fluorescence included in the illumination light is non-polarized light while the blue light is the s-polarized light, it is necessary to prevent the blue light from being emitted from a light emission surface of a polarization conversion element 433 described later in a striped manner to cause color shading in the image to be projected.

A part of such a light source device 41 is disposed inside a second sealed housing 541 (see FIG. 5) as a roughly sealed housing. Specifically, the light diffusion device 417 and the wavelength conversion device 419 as the cooling targets are disposed inside the second sealed housing 541 described later. Further, although described later in detail, a fourth refrigerant RE4 inside the second sealed housing 541 circulates through the light diffusion device 417 and the wavelength conversion device 419, and thus, the devices 417, 419 are cooled.

Configuration of Homogenizing Device

As shown in FIG. 2, the illumination light emitted from the light source device 41 enters the homogenizing device 43 of the image forming device 42. The homogenizing device homogenizes the illuminance distribution of the illumination light entering the homogenizing device 43 from the light source device 41. Such a homogenizing device 43 is provided with a first lens array 431, a second lens array 432, a polarization conversion element 433, and a superimposing lens 434.

Among these, the polarization conversion element 433 has a plurality of polarization separation layers, a plurality of reflecting layers, and a plurality of retardation layers although the detailed illustration is omitted.

The plurality of polarization separation layers and the plurality of reflecting layers are formed so as to be elongated in the +Y direction, and are alternately arranged in the +Z direction. It should be noted that the polarization separation layers are disposed at positions which the partial light beams having been emitted from the second lens array 432 enters, respectively. Further, the reflecting layers are disposed at positions which the respective partial light beams do not directly enter.

The polarization separation layers each transmit the p-polarized light and each reflect the s-polarized light. The reflecting layers disposed so as to correspond respectively to the polarization separation layers each reflect the s-polarized light having been reflected by the corresponding polarization separation layer so as to reflect along the passing direction of the p-polarized light. Then, each of the retardation layers is disposed on the light path of the p-polarized light having passed through the polarization separation layer, and converts the p-polarized light entering the retardation layer into the s-polarized light. Thus, the light beams emitted from the polarization conversion element 433 are uniformed in polarization direction to be s-polarized light, and the s-polarized light is emitted from the roughly entire area in the light emission surface of the polarization conversion element 433. It should be noted that the polarization conversion element 433 can also be provided with a configuration of uniforming the light beams into the p-polarized light and emitting the p-polarized light.

Configuration of Color Separation Device

The color separation device 44 separates the light beam input from the homogenizing device 43 into three colored light beams of red (R), green (G), and blue (B). The color separation device 44 has dichroic mirrors 441, 442, and a reflecting mirror 443. Besides the above, the color separation device 44 can also be provided with a lens which the blue light LB reflected by the dichroic mirror 441 enters, and a lens which the green light LG and the red light LR having passed through the dichroic mirror 441 enter.

Configuration of Relay Device

The relay device 45 is disposed on the light path of the red light LR having passed through the dichroic mirror 442 to guide the red light LR to a field lens 471 for the red light LR. The relay device 45 is provided with an incident-side lens 451, a reflecting mirror 452, a relay lens 453, and a reflecting mirror 454. It should be noted that it is assumed that the relay device 45 is provided with a configuration of transmitting the red light LR in the present embodiment, but is not limited to this configuration, and can also be provided with a configuration of transmitting, for example, the blue light LB.

Configuration of Optical Component Housing

The optical component housing 46 is a box-like housing having the illumination light axis Ax set inside. At positions on the illumination light axis Ax inside the optical component housing 46, there are disposed the homogenizing device 43, the color separation device 44 and the relay device 45. The light source device 41 is disposed so that the second illumination light axis Ax2 described above corresponds to the illumination light axis Ax. Further, the electro-optic device 47 and the projection optical device 48 are also disposed in accordance with the illumination light axis Ax although located outside the optical component housing 46.

Such an optical component housing 46 is combined with another housing to constitute a first sealed housing 511 described later. The first sealed housing 511 forms a first space S1 inside of which is roughly sealed. Inside such a first sealed housing 511, there are disposed the polarization conversion element 433 and the electro-optic device 47.

Configuration of Electro-Optic Device

The electro-optic device 47 modulates each of the colored light beams, which have been separated into, and then combines the colored light beams, which have been modulated, with each other to form image light. The electro-optic device 47 has the field lenses 471, light modulation devices 472, and cooling sections 476 (see FIG. 4) respectively provided for the colored light beams, and one color combining device 477.

The field lenses 471 are each a lens for collimating the incident light, and are each inserted in a groove part provided to the optical component housing 46 described above and are each disposed on the illumination light axis Ax described above.

The light modulation devices 472 (the light modulation devices for red, green, and blue are respectively defined as 472R, 472G, and 472B) each modulate the light emitted from the first light source 4101 and the light emitted from the second light source 4102. More specifically, the light modulation devices 472 each modulate the colored light beam entering the light modulation device 472 via the corresponding field lens 471 in accordance with the image information to form the image. In the present embodiment, the light modulation devices 472 each have a liquid crystal panel 474, and an incident side polarization plate 473 and an emission side polarization plate 475 located on the light incident side and the light emission side of the liquid crystal panel 474. In other words, in the present embodiment, the light modulation devices 472 are each constituted by a liquid crystal light valve.

Figure 4:
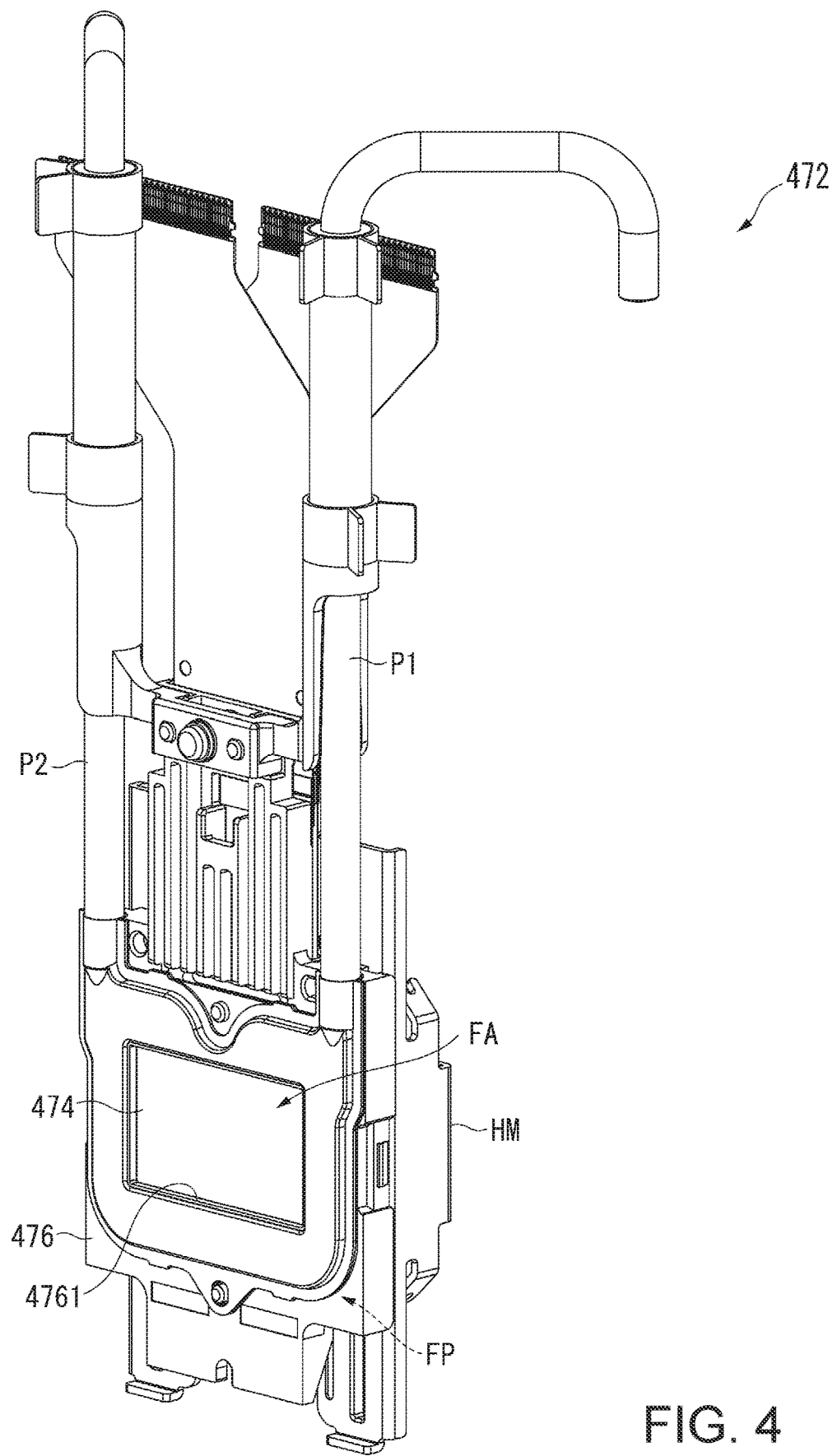
FIG. 4 is a perspective view showing a liquid crystal panel in the first embodiment described above.

FIG. 4 is a perspective view of the cooling section 476 for cooling the light modulation device 472 viewed from the light incident side. It should be noted that in FIG. 4, illustration of the incident side polarization plate 473 and the emission side polarization plate 475 constituting the light modulation device 472 is omitted.

As shown in FIG. 4, the cooling section 476 is disposed so as to correspond to each of the light modulation devices 472. The cooling section 476 is a frame-like member for housing the liquid crystal panel 474 inside, and further, cools the liquid crystal panel 474 and the polarization plates 473, 475. Such cooling sections 476 correspond to a second cooling section.

In the surface located on the light incident side of the cooling section 476, at the position corresponding to an image forming area FA (a modulation area) of the liquid crystal panel 474, there is formed an opening section 4761 for allowing the corresponding colored light beam to enter the image forming area FA. Further, although not shown in the drawings, in the surface located on the light emission side of the cooling section 476, there is formed an opening section through which the colored light beam having passed through the liquid crystal panel 474 is emitted. It should be noted that the image forming area FA is formed landscape so as to have an aspect ratio of 16:9 or 4:3.

On the surface located on the light emission side in such a cooling section 476, there is disposed an attachment member HM to be attached to a holding member (not shown) fixed to each of planes of incidence of the color combining device 477 to combine the light modulation device 472 with the color combining device 477.

The cooling section 476 has pipes P1, P2 extending in the +Y direction from the both ends in a direction parallel to the long side of the image forming area FA. One of these pipes P1, P2 is connected to a pipe CM12 (see FIG. 5) described later, and further, the other of the pipes P1, P2 is connected to a pipe CM22 (see FIG. 5) described later. Further, inside the cooling section 476, there is formed a flow channel FP through which the second refrigerant RE2 (see FIG. 5) as a liquid refrigerant flowing in through the one of the pipes can circulate.

Further, the cooling section 476 transfers the heat which is transferred from the liquid crystal panel 474 and the polarization plates 473, 475, to the liquid refrigerant circulating through the flow channel FP to cool these liquid crystal panel 474 and the polarization plates 473, 475. Specifically, each of the cooling sections 476 transmits the heat of corresponding one of the light modulation devices 472 to the second refrigerant RE2 (the second liquid refrigerant) circulating the inside thereof to thereby cool the light modulation device 472. The liquid refrigerant having circulated through the flow channel FP in such a manner is discharged through the other pipe described above.

As shown in FIG. 2, the color combining device 477 is constituted by a cross dichroic prism formed to have a roughly quadrangular prism shape. The color combining device 477 has three planes of incidence which the colored light beams having passed through the respective light modulation devices 472 enter, and the emission surface from which the image light formed by combining the colored light beams with each other is emitted. The emission surface is opposed to the projection optical device 48.

In such a color combining device 477, the planes of incidence are respectively provided with holding members to which the attachment members HM described above are attached. The color combining device 477, and the light modulation devices 472 and the cooling sections 476 are integrated by the holding members. Hereinafter, the configuration in which the light modulation devices 472 and the cooling sections 476, and the color combining device 477 are integrated with each other is referred to as an image forming unit FU in some cases.

Configuration of Projection Optical Device

The projection optical device 48 is disposed so as to partially be exposed from the opening section 231 (see FIG. 1), and projects the image light entering the projection optical device 48 from the color combining device 477 on the projection target surface in an enlarged manner. Such a projection optical device 48 can be configured as a combination lens having a plurality of lenses arranged in a lens tube.

Configuration of Cooling Device

Figure 5:
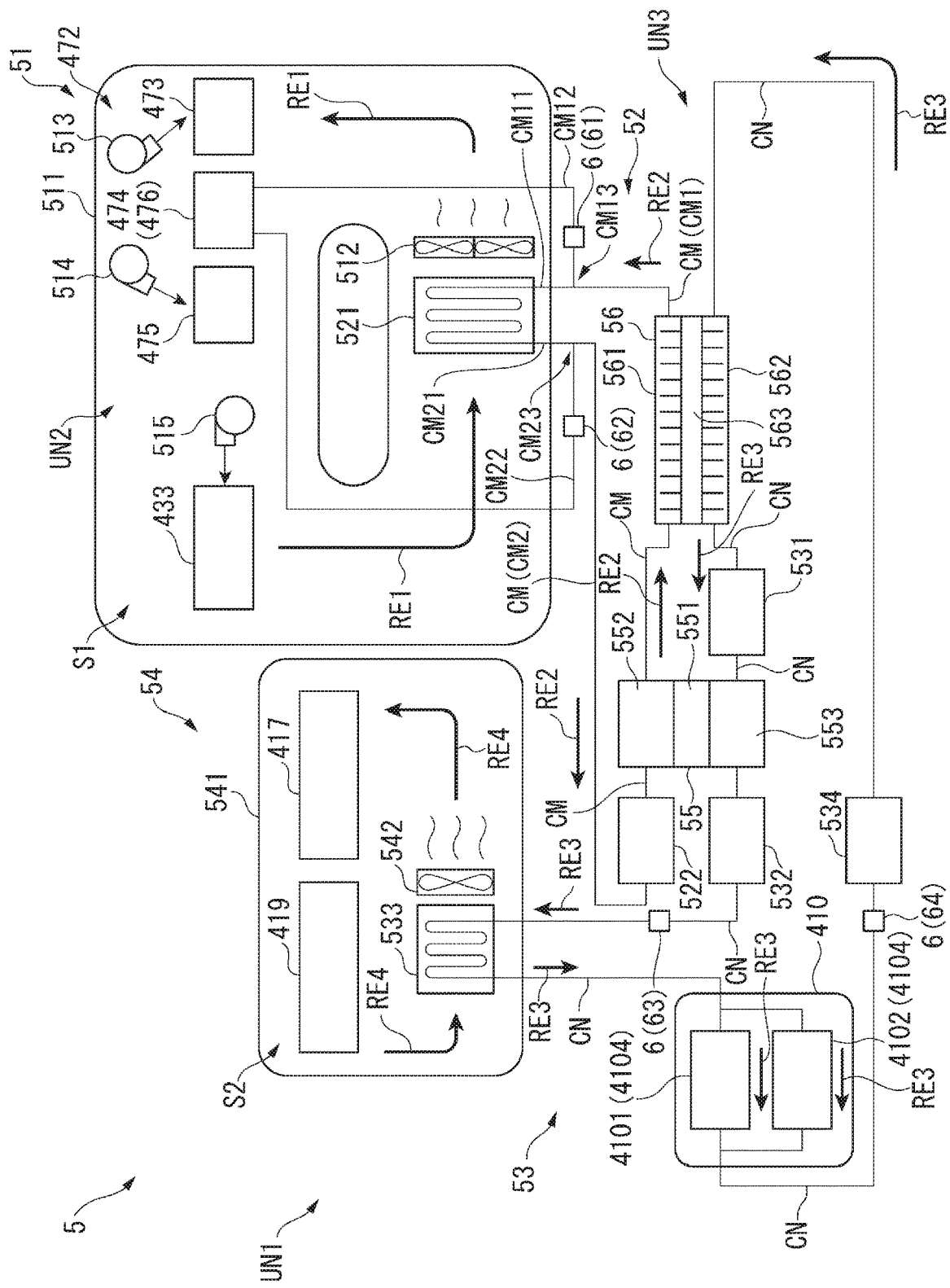
FIG. 5 is a schematic diagram showing a configuration of a cooling device in the first embodiment described above.

FIG. 5 is a schematic diagram showing a configuration of the cooling device 5.

The cooling device 5 cools the cooling targets constituting the projector 1. The cooling device 5 is provided with a first circulation channel 51, a second circulation channel 52, a third circulation channel 53 and a fourth circulation channel 54 as a configuration for cooling the image projection device 4 as shown in FIG. 5. These circulation channels 51 through 54 circulate a gaseous refrigerant or a liquid refrigerant to thereby cool the cooling targets.

Each of the circulation channels 51 through 54 will hereinafter be described.

Configuration of First Circulation Channel

The first circulation channel 51 is a flow channel through which the first refrigerant RE1 as a gas in the first sealed housing 51 circulates, and cools the first cooling target with the first refrigerant RE1. The first circulation channel 51 is configured including a first sealed housing 511, a circulation fan 512 and blast fans 513 through 515, and a first heat exchanger 521.

It should be noted that the first refrigerant RE1 is only required to be a gas, and can also be a gas (e.g., nitrogen gas or helium gas) other than air.

The first sealed housing 511 is configured by the optical component housing 46 and another housing combined with each other as described above, and forms the first space S1 described above inside. Inside the first sealed housing 511, there are disposed the polarization conversion element 433 and the electro-optic device 47 as the cooling targets, the circulation fan 512, the blast fans 513 through 515 and the first heat exchanger 521.

The first heat exchanger 521 constitutes the first circulation channel 51 and the second circulation channel 52 described later. The first heat exchanger 521 transmits the heat of the first refrigerant RE1 to the second refrigerant RE2 circulating inside to thereby cool the first refrigerant RE1.

The circulation fan 512 is a fan for circulating the first refrigerant RE1 having been cooled by the first heat exchanger 521 inside the first sealed housing 511.

In the present embodiment, the blast fans 513, 514 are disposed for each of the light modulation devices 472R, 472G, 472B, and circulate the first refrigerant RE1 through the corresponding light modulation device 472. In the detailed description, the blast fan 513 feeds the first refrigerant RE1 to the incident side polarization plate 473 and the liquid crystal panel 474 (the cooling section 476) of the corresponding light modulation device 472, and the blast fan 514 feeds the first refrigerant RE1 to the liquid crystal panel 474 (the cooling section 476) and the emission side polarization plate 475 of the corresponding light modulation device 472. It should be noted that it is also possible to dispose a single blast fan 513 and a single blast fan 514 and divide the flow of the first refrigerant RE1 fed by the blast fan 513 to circulate through the respective light modulation devices 472, and divide the flow of the first refrigerant RE1 fed by the blast fan 514 to circulate through the respective light modulation devices 472.

The blast fan 515 circulates the first refrigerant RE1 through the polarization conversion element 433.

In such a first circulation channel 51, the first refrigerant RE1 having cooled the polarization conversion element 433 and the light modulation devices 472 is suctioned by the circulation fan 512 to circulate through the first heat exchanger 521. Then, the first refrigerant RE1 having been cooled by the first heat exchanger 521 circulates once again through the light modulation devices 472 and the polarization conversion element 433. As described above, the first refrigerant RE1 circulates through the first sealed housing 511.

Configuration of Second Circulation Channel

The second circulation channel 52 is a flow channel through which the second refrigerant RE2 (a second liquid refrigerant) as a liquid refrigerant circulates, and cools the first refrigerant RE1 and at the same time cools the liquid crystal panels 474 of the respective light modulation devices 472. The second circulation channel 52 is configured including the first heat exchanger 521, a tank 522, a pump 55 and a second heat exchanger 56, the cooling sections 476 (the second cooling sections) described above, and a plurality of connection members CM for connecting these constituents.

It should be noted that the connection members CM are each a tubular member formed so that the second refrigerant RE2 can circulate through the tubular member. The plurality of connection members CM corresponds to a second connection member. Further, as such a refrigerant RE2, there can be cited water and an antifreeze solution such as propylene glycol.

The first heat exchanger 521 cools the first refrigerant RE1 as described above.

The tank 522 temporarily retains the second refrigerant RE2. The second refrigerant RE2 retained in the tank 522 is suctioned by the pump 55.

The pump 55 has a pressure feeding section 551 and inflow chambers 552, 553.

The second refrigerant RE2 flows into the inflow chamber 552 from the tank 522. The second refrigerant RE2 having flown into the inflow chamber 552 is circulated by driving the pressure feeding section 551 to the first heat exchanger 521 via a heat receiving section 561 of a second heat exchanger 56. Further, the third refrigerant RE3 (the first liquid refrigerant) circulating the third circulation channel 53 described later flows into the inflow chamber 553. The third refrigerant RE3 having flown into the inflow chamber 553 will be described later in detail.

The second heat exchanger 56 is provided with the heat receiving section 561 through which the second refrigerant RE2 pressure-fed by the pump 55 circulates, a heat radiation section 562 through which the third refrigerant RE3 circulates, and a heat transmission section 563 for transmitting the heat of the second refrigerant RE2 received by the heat receiving section 561 to the heat radiation section 562. Due to the second heat exchanger 56, the second refrigerant RE2 the heat of which is transmitted to the third refrigerant RE3, and which is thus cooled, is circulated through the first heat exchanger 521 described above. It should be noted that in the present embodiment, a Peltier element is used as the heat transmission section 563 in order to increase the heat-transfer efficiency from the heat receiving section 561 to the heat radiation section 562. However, this is not a limitation, but such a Peltier element can be eliminated.

Here, among the plurality of connection members CM, the connection member CM1 through which the second refrigerant RE2 cooled by the second heat exchanger 56 circulates has a pipe CM11 connected to the first heat exchanger 521, a pipe CM12 connected to the one of the pipes described above of the cooling section 476, and a branch part CM13 for connecting these pipes CM11, CM12 to each other and distributing the second refrigerant RE2 to the pipes CM11, CM12. Due to the configuration of such a connection member CM1, a part of the second refrigerant RE2 flowed in the connection member CM1 is circulated through the first heat exchanger 521, and another part of the second refrigerant RE2 is circulated through the cooling sections 476. Therefore, the light modulation devices 472 are cooled not only by the first refrigerant RE1 but also by the second refrigerant RE2.

Further, among the plurality of connection members CM, the connection member CM2 for circulating the second refrigerant RE2 to the tank 522 has a pipe CM21 to be connected to the first heat exchanger 521, a pipe CM22 to be connected to the other of the pipes described above of the cooling section 476, and a junction part CM23 for connecting these pipes CM21, CM22 to each other. Due to such a connection member CM2, the second refrigerant RE2 having circulated through the first heat exchanger 521 and the second refrigerant RE2 having circulated through the cooling sections 476 provided to the respective light modulation devices 472 are merged in the junction part CM23 to circulate to the tank 522.

It should be noted that although one cooling section 476 connected to the pipe CM12 and the pipe CM22 is shown in FIG. 5, in the present embodiment, the second refrigerant RE2 circulating via the pipe CM12 circulates through the cooling sections 476 provided to the respective light modulation devices 472 in sequence. Therefore, the one of the pipes described above in the cooling section 476 located on the upstream-most side in the circulation direction of the second refrigerant RE2 is connected to the pipe CM12, and the other of the pipes described above in that cooling section 476 is connected to the one of the pipes described above in another cooling section 476. Further, the other of the pipes described above in the cooling section 476 located on the downstream-most side is connected to the pipe CM22 described above.

However, this is not a limitation, but it is also possible to adopt a configuration in which the one of the pipes described above in each of the cooling sections 476 is connected to the pipe CM12, and the other of the pipes described above in each of the cooling sections 476 is connected to the pipe CM22.

In such a second circulation channel 52, the second refrigerant RE2 retained in the tank 522 is suctioned by the pump 55 to be pressure-fed to the second heat exchanger 56.

The second refrigerant RE2 which is circulated through the heat receiving section 561 of the second heat exchanger 56 to thereby be cooled, circulates to the first heat exchanger 521 and each of the cooling sections 476 due to the connection member CM1. The second refrigerant RE2 to which the heat of the first heat exchanger 521 and each of the cooling sections 476 is transferred is made to flow into the tank 522 via the connection member CM2, and is then retained in the tank 522 once again. As described above, the second refrigerant RE2 circulates through the second circulation channel 52 while cooling the first heat exchanger 521 to which the heat of the first refrigerant RE1 has been transferred, and each of the light modulation devices 472. It should be noted that as described above, the heat of the second refrigerant RE2 is transferred to the third refrigerant RE3 in the second heat exchanger 56.

Configuration of Fourth Circulation Channel

Here, the fourth circulation channel 54 will be described in advance.

The fourth circulation channel 54 is a flow channel for circulating the fourth refrigerant RE4 as a gas in the second sealed housing 541 to cool the cooling targets located inside the second sealed housing 541. The fourth circulation channel 54 is provided with a second sealed housing 541, and a third heat exchanger 533 and a circulation fan 542 each disposed inside the second sealed housing 541. It should be noted that the fourth refrigerant RE4 can be the same as or different from the first refrigerant RE1 in components.

The second sealed housing 541 forms a roughly sealed second space S2 inside. Inside the second sealed housing 541, there are disposed the light diffusion device 417 and the wavelength conversion device 419 which are the cooling targets and some of the constituents of the light source device 41 described above. Thus, the dust can be prevented from adhering to the light diffusion device 417 and the wavelength conversion device 419.

The third heat exchanger 533 constitutes the fourth circulation channel 54 and the third circulation channel 53 described later. The third heat exchanger 533 transmits the heat of the fourth refrigerant RE4 to the third refrigerant RE3 circulating inside to thereby cool the fourth refrigerant RE4. In other words, the heat of the light diffusion element 4171 included in the light diffusion device 417 and the heat of the wavelength conversion element 4191 included in the wavelength conversion device 419 both transmitted via the fourth refrigerant RE4 are transmitted by the third heat exchanger 533 to the third refrigerant RE3, and thus, the optical elements of the light diffusion element 4171 and the wavelength conversion element 4191 are cooled by the third heat exchanger 533. Such a third heat exchanger 533 corresponds to a third cooling section. Further, the third heat exchanger 533, the light diffusion element 4171 and the wavelength conversion element 4191 correspond to an optical element section. It should be noted that in the present embodiment, it is sufficient for the optical element section to include at least one optical element of the light diffusion element 4171 and the wavelength conversion element 4191, and the third heat exchanger 533.

The circulation fan 542 circulates the fourth refrigerant RE4 inside the second sealed housing 541. The circulation fan 542 circulates the fourth refrigerant RE4 cooled in the third heat exchanger 533 through the light diffusion device 417 and the wavelength conversion device 419 to thereby cool these constituents. In the present embodiment, the third heat exchanger 533 and the circulation fan 542 are constituents which constitute the cooling device 5 and are included in the light source device 41 at the same time.

It should be noted that in FIG. 5, the fourth refrigerant RE4 is illustrated so as to circulate through the light diffusion device 417 and then circulate through the wavelength conversion device 419. However, the order of the circulation of the fourth refrigerant RE4 can be reversed, and it is also possible for the flow channel of the fourth refrigerant RE4 to be a flow channel in which the fourth refrigerant RE4 divided into two respectively flows through the light diffusion device 417 and the wavelength conversion device 419.

Configuration of Third Circulation Channel

The third circulation channel 53 is a flow channel for circulating the third refrigerant RE3 (the first liquid refrigerant) as the liquid refrigerant to thereby cool the second refrigerant RE2 and the fourth refrigerant RE4, and further cool the light source section 410 of the light source device 41. The third circulation channel 53 is configured including the tank 531, the pump 55, a first radiator 532 also shown in FIG. 1, the third heat exchanger 533, the two light source cooling sections 4104, a second radiator 534 and the second heat exchanger 56 also shown in FIG. 1, and a plurality of connection members CN for connecting these constituents to each other.

Among these constituents, the connection members CN are each a tubular member through which the third refrigerant RE3 can circulate. The plurality of connection members CN corresponds to a first connection member. It should be noted that the third refrigerant RE3 can be the same as or different from the second refrigerant RE2 in components.

The tank 531 is connected to the heat radiation section 562 of the second heat exchanger 56 described above, and temporarily retains the third refrigerant RE3.

The third refrigerant RE3 having been made to flow into the inflow chamber 553 from the tank 531 by the pressure feeding section 551 is pressure-fed by the pump 55 to the first radiator 532.

The first radiator 532 is located immediately upstream with respect to the third heat exchanger 533 in the flow channel of the third refrigerant RE3, and cools the third refrigerant RE3 circulating through the third heat exchanger 533. In other words, the first radiator 532 is located upstream with respect to the optical element section in the flow channel of the third refrigerant RE3, and radiates the heat of the third refrigerant RE3 before circulating through the optical element section to thereby cool the third refrigerant RE3. Specifically, the first radiator 532 transmits the heat received from the third refrigerant RE3 pressure-fed from the pump 55 and circulating inside the first radiator 532 to the cooling gas circulating through the first radiator 532 to thereby cool the third refrigerant RE3. The first radiator 532 corresponds to a radiator in the invention. Further, the first radiator 532 corresponds to a heat radiator. It should be noted that the arrangement of the first radiator 532, and a cooling fan FN4 (see FIG. 1) for circulating the cooling gas through the first radiator 532 will be described later in detail.

The third heat exchanger 533 transmits the heat of the fourth refrigerant RE4 to the third refrigerant RE3 circulating from the first radiator 532 as described above to cool the fourth refrigerant RE4. The third refrigerant RE3 having circulated through the third heat exchanger 533 circulates through two light source cooling sections 4104.

The light source cooling sections 4104 are provided respectively for the first light source 4101 and the second light source 4102 (see FIG. 2) as described above, and the third refrigerant RE3 having circulated through the third heat exchanger 533 is divided to circulate through the respective light source cooling sections 4104.

In the inside of these light source cooling sections 4104, there is formed a plurality of fine flow channels through which the third refrigerant RE3 can circulate, and thus, the heat of each of the solid-state light sources SS transmitted from the solid-state light source array SA (see FIG. 3) is transmitted to the third refrigerant RE3 to thereby cool the respective solid-state light sources SS. The third refrigerant RE3 having circulated through these light source cooling sections 4104 merges to circulate through the second radiator 534.

It should be noted that it is also possible for the third refrigerant RE3 to be supplied first to one of the light source cooling sections 4104, and then supplied to the other of the light source cooling sections 4104 without being divided.

The second radiator 534 transmits and then radiates the heat of the third refrigerant RE3 circulating inside to the cooling gas circulated through the second radiator 534 to thereby cool the third refrigerant RE3. The third refrigerant RE3 cooled by the second radiator 534 is circulated through the heat radiation section 562 of the second heat exchanger 56 described above. The second radiator 534 corresponds to a heat radiator. In other words, the heat radiator includes the first radiator 532 and the second radiator 534. It should be noted that in the present embodiment, it is sufficient for the heat radiator to include at least one of the first radiator 532 and the second radiator 534. The arrangement of the second radiator 534, and a cooling fan FN5 (see FIG. 1) for circulating the cooling gas through the second radiator 534 will be described later in detail.

In such a third circulation channel 53, the third refrigerant RE3 retained in the tank 531 is pressure-fed by the pump 55, and is supplied to the third heat exchanger 533 in the second sealed housing 541 via the first radiator 532. Due to the third heat exchanger 533, the fourth refrigerant RE4 located inside the second sealed housing 541 is cooled, and the third refrigerant RE3 having circulated through the third heat exchanger 533 circulates through the light source cooling sections 4104 to cool the first light source 4101 and the second light source 4102. The third refrigerant RE3 having cooled these light sources 4101, 4102 is cooled in the second radiator 534, and then circulates through the heat radiation section 562 of the second heat exchanger 56. The third refrigerant RE3 to which the heat of the second refrigerant RE2 is transmitted in the heat radiation section 562 is retained once again in the tank 531. As described above, the third refrigerant RE3 circulates through the third circulation channel 53.

Classification by Function

The configuration of the image projection device 4 and the cooling device 5 is classified by the function into a light source unit UN1, an optical unit UN2 and a cooling unit UN3.

The light source unit UN1 is the light source device 41, and includes the light source section 410 having the light sources 4101, 4102, and the light source cooling section 4104 (the first cooling section) for cooling the light sources 4101, 4102 with the third refrigerant RE3 (the first liquid refrigerant). Further, the light source unit UN1 includes the optical element section having the optical elements such as the light diffusion element 4171 and the wavelength conversion element 4191, and the third heat exchanger 533 (the third cooling section) for cooling the light diffusion element 4171 and the wavelength conversion element 4191 with the third refrigerant RE3 (the first liquid refrigerant) via the fourth refrigerant RE4 circulating inside the second sealed housing 541.

The optical unit UN2 is the image forming device 42, and the optical unit UN2 includes the image forming unit FU having the light modulation devices 472, and the cooling sections 476 (the second cooling section) for cooling the respective light modulation devices 472 with the second refrigerant RE2 (the second liquid refrigerant).

The cooling unit UN3 is constituted by constituents related to cooling of the third refrigerant RE3 circulating through the light source unit UN1, and cooling of the second refrigerant RE2 circulating through the optical unit UN2 out of the constituents of the cooling device 5 described above. In other words, the cooling unit UN3 cools the third refrigerant RE3 (the first liquid refrigerant) and the second refrigerant RE2 (the second liquid refrigerant). Specifically, the cooling unit UN3 has at least the first radiator 532 (the heat radiator, a radiator) and the second radiator 534 (the heat radiator) for radiating the heat of the third refrigerant RE3, and is constituted by a part of the second circulation channel 52 and a part of the third circulation channel 53.

Further, the light source unit UN1 and the cooling unit UN3 are connected to each other with the connection members CN (the first connection members). Further, the optical unit UN2 and the cooling unit UN3 are connected to each other with the connection members CM (the second connection members).

The light source unit UN1, the optical unit UN2 and the cooling unit UN3 constitute a single cooling system. Specifically, the heat generated in the light source unit UN1 and the optical unit UN2 is radiated by the common single cooling unit UN3. According to this configuration, it is possible to miniaturize the whole of the cooling system, and at the same time reduce the manufacturing cost. It should be noted that as described above, the light source unit UN1, the optical unit UN2 and the cooling unit UN3 are housed inside the exterior housing 2.

Further, the light source unit UN1, the optical unit UN2 and the cooling unit UN3 can be separated from each other in connection sections 6 (61, 62) provided to the connection members CM and connection sections 6 (63, 64) provided to the connection members CN. In other words, as shown in FIG. 5, the light source unit UN1 and the cooling unit UN3 are configured so as to detachably be attached to each other in the connection sections 6 (61, 62), and the optical unit UN2 and the cooling unit UN3 are configured so as to detachably be attached to each other in the connection sections 6 (63, 64). It should be noted that in the present embodiment, it is sufficient for the two units configured so as to detachably be attached to each other with the connection sections 6 to be at least one of a set of the light source unit UN1 and the cooling unit UN3, and a set of the optical unit UN2 and the cooling unit UN3.

Specifically, the connection sections 61, 62 are connection sections provided to the connection members CM and detachably connecting the optical unit UN2 and the cooling unit UN3 to each other. Among these constituents, the connection section 61 is provided to the pipe CM12 of the connection member CM1. The connection section 62 is provided to the pipe CM22 of the connection member CM2. In the detailed description, the connection section 61 is disposed at a region located outside the first sealed housing 511 in the pipe CM12. Further, the connection section 62 is disposed at a region located outside the first sealed housing 511 in the pipe CM22.

Figure 6:
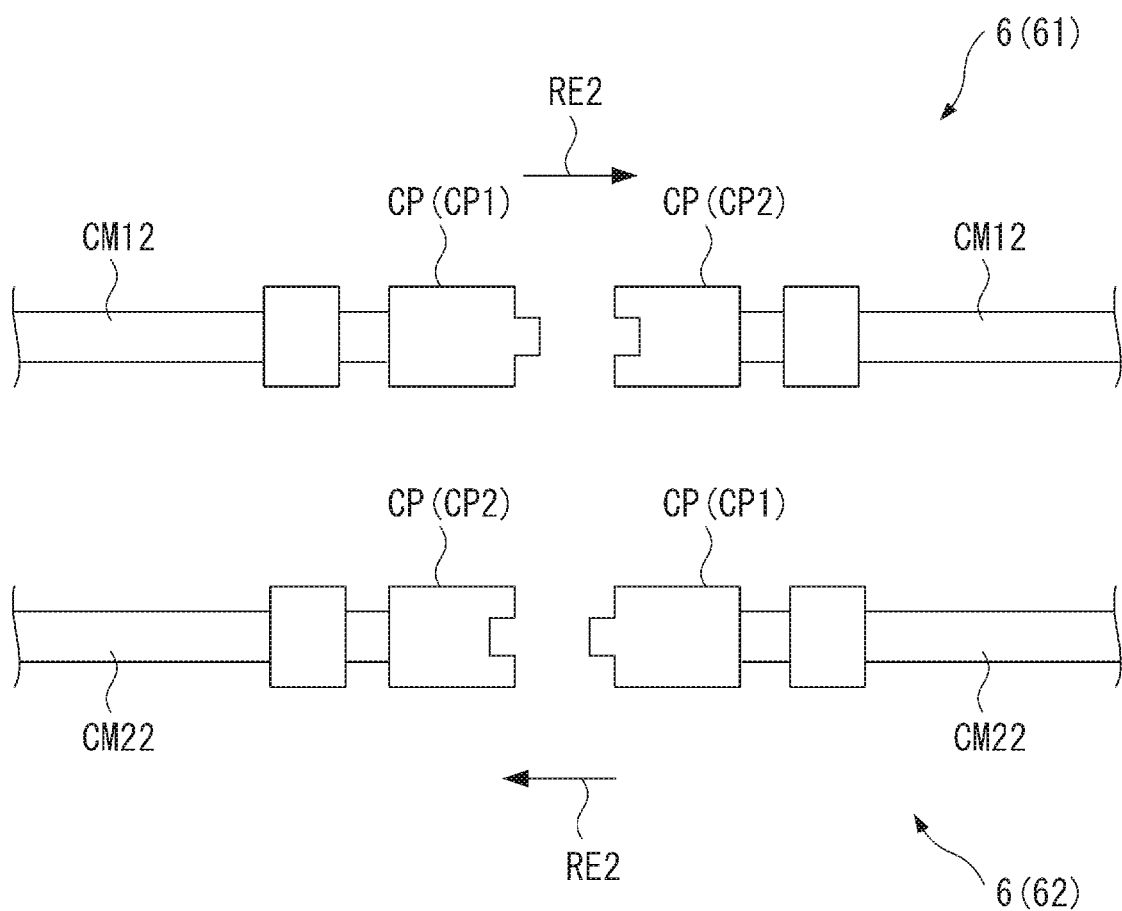
FIG. 6 is a schematic diagram showing a configuration of a connection section in the first embodiment described above.

FIG. 6 is a schematic diagram showing a configuration of the connection sections 61, 62.

As shown in FIG. 6, these connection sections 61, 62 are each formed of a coupler CP having a male coupler CP1 and a female coupler CP2 disposed so as to detachably be attached to the male coupler CP1. The shape of the male coupler CP1 and the shape of the female coupler CP2 are different from each other. The male coupler CP1 and the female coupler CP2 correspond respectively to a first connection section and a second connection section.

In the present embodiment, the male coupler CP1 is located on the upstream side in the circulation direction of the second refrigerant RE2 circulating through the connection sections 61, 62. In contrast, the female coupler CP2 is located on the downstream side in that circulation direction.

The male coupler CP1 in the connection section 61 is connected to the cooling unit UN3. Specifically, the male coupler CP1 of the connection section 61 is connected to the first heat exchanger 521 and the second heat exchanger 56 via the branch part CM13.

The female coupler CP2 in the connection section 61 is connected to the optical unit UN2. Specifically, the female coupler CP2 of the connection section 61 is connected to the cooling section 476 corresponding to the light modulation device 472 located on the upstream-most side in the circulation direction of the second refrigerant RE2 out of the light modulation devices 472R, 472G, 472B.

Further, the male coupler CP1 in the connection section 62 is connected to the optical unit UN2. Specifically, the male coupler CP1 of the connection section 62 is connected to the cooling section 476 corresponding to the light modulation device 472 located on the downstream-most side in the circulation direction of the second refrigerant RE2 out of the light modulation devices 472R, 472G, 472B.

The female coupler CP2 in the connection section 62 is connected to the cooling unit UN3. Specifically, the male coupler CP1 of the connection section 62 is connected to the first heat exchanger 521 and the tank 522 via the junction part CM23.

In other words, the connection members CM (the second connection members) have the male coupler CP1 (the first connection section) to be connected to the optical unit UN2 out of the optical unit UN2 and the cooling unit UN3 connected to each other with the connection members CM, and the female coupler CP2 (the second connection section) to be connected to the cooling unit UN3 out of the optical unit UN2 and the cooling unit UN3, and to detachably be attached to the male coupler CP1. Further, the connection members CM have a plurality of sets of the connection section 61 and the connection section 62, namely the male coupler CP1 and the female coupler CP2.

The male coupler CP1 and the female coupler CP2 are different in shape from each other, and are coupled to each other by inserting apart of the male coupler CP1 into the female coupler CP2. However, the male couplers CP1 cannot be coupled to each other, and the female couplers CP2 cannot be coupled to each other.

In each of the connection sections 61, 62, by separating the male coupler CP1 and the female coupler CP2 from each other, the optical unit UN2 (the image forming unit FU including the light modulation devices 472) described above can be separated from the cooling unit UN3, and thus detached from the projector 1. Therefore, in the case in which the necessity of replacement or repair has arisen in the optical unit UN2, by separating the optical unit UN2 from the cooling unit UN3 in these connection sections 61, 62, it becomes possible to detach the optical unit UN2.

In particular, in the configuration related to the present embodiment in which the light source unit UN1, the optical unit UN2 and the cooling unit UN3 constitute the single cooling system, in the case in which there is a necessity for replacing or repairing any of the components constituting the optical unit UN2, since it is not necessary to detach the whole of the cooling system from the projector 1, it is possible to further improve the maintainability of the projector 1.

It should be noted that the coupler CP is a valved coupler, and in the state in which the male coupler CP1 and the female coupler CP2 are coupled to each other, the flow channel inside the coupler CP is opened to make it possible for the refrigerant (the second refrigerant RE2) to circulate through the coupler CP. In contrast, in the state in which the male coupler CP1 and the female coupler CP2 are separated from each other, the flow channel inside the coupler CP is blocked to disable the refrigerant to circulate through the coupler CP. Therefore, the second refrigerant RE2 is prevented from being leaked from the connection sections 61, 62 when separating the optical unit UN2 and the cooling unit UN3 from each other.

Further, as shown in FIG. 5, the connection sections 63, 64 are provided to the connection members CN, and detachably connect the light source unit UN1 and the cooling unit UN3 to each other. Among these constituents, the connection section 63 is disposed in a region located outside the second sealed housing 541 in the connection member CN for guiding the third refrigerant RE3 from the first radiator 532 to the third heat exchanger 533. Further, the connection section 64 is disposed in the connection member CN for guiding the third refrigerant RE3 from the light source cooling sections 4104 to the second radiator 534 and between a region where the third refrigerant RE3 having circulated through the respective light source cooling sections 4104 is merged and the second radiator 534.

In the present embodiment, although not shown in the drawings, similarly to the connection sections 61, 62 described above, the connection sections 63, 64 are each formed of the coupler CP constituted by the male coupler CP1 located on the upstream side in the circulation direction of the third refrigerant RE3 circulating, and the female coupler CP2 located on the downstream side in the circulation direction and detachably attached to the male coupler CP1.

The male coupler CP1 in the connection section 63 is connected to the cooling unit UN3. Specifically, the male coupler CP1 in the connection section 63 is connected to the first radiator 532.

The female coupler CP2 in the connection section 63 is connected to the light source unit UN1. Specifically, the female coupler CP2 in the connection section 63 is connected to the third heat exchanger 533.

Further, the male coupler CP1 in the connection section 64 is connected to the light source unit UN1. Specifically, the male coupler CP1 in the connection section 64 is connected to the two light source cooling sections 4104.

The female coupler CP2 in the connection section 64 is connected to the cooling unit UN3. Specifically, the male coupler CP1 in the connection section 64 is connected to the second radiator 534.

In other words, the connection members CN (the first connection members) have the male coupler CP1 (the first connection section) to be connected to the light source unit UN1 out of the light source unit UN1 and the cooling unit UN3 connected to each other with the connection members CN, and the female coupler CP2 (the second connection section) to be connected to the cooling unit UN3 out of the light source unit UN1 and the cooling unit UN3, and to detachably be attached to the male coupler CP1. Further, the connection members CN have a plurality of sets of the connection section 63 and the connection section 64, namely the male coupler CP1 and the female coupler CP2.

Further, in each of the connection sections 63, 64, by separating the male coupler CP1 and the female coupler CP2 from each other, the light source unit UN1 (the light source device 41) described above can be separated from the cooling unit UN3, and thus detached from the projector 1. Therefore, similarly to the above, in the case in which the necessity of replacement or repair has arisen in the light source unit UN1, by separating the light source unit UN1 from the cooling unit UN3 in these connection sections 63, 64, it becomes possible to detach the light source unit UN1. As described above, in the configuration related to the present embodiment in which the light source unit UN1, the optical unit UN2 and the cooling unit UN3 constitute the single cooling system, in the case in which there is a necessity for replacing or repairing any of the components constituting the light source unit UN1, since it is not necessary to detach the whole of the cooling system from the projector 1, it is possible to further improve the maintainability of the projector 1.

It should be noted that in each of the connection sections 61 through 64, by separating the male coupler CP1 and the female coupler CP2 from each other, it is possible to separate the cooling unit UN3 from the light source unit UN1 and the optical unit UN2. Therefore, in this case, it is possible to detach the cooling unit UN3 from the projector 1. Similarly, in the case in which there is a necessity for replacing or repairing any of the components constituting the cooling unit UN3, since it is not necessary to detach the whole of the cooling system from the projector 1, it is possible to further enhance the maintainability of the projector 1.

In the present embodiment, as described above, it is sufficient that at least one of the connection members CM and the connection members CN has the connection section including the male coupler CP1 and the female coupler CP2 detachably attached to the male coupler CP1.

Further, in the present embodiment, it is sufficient for the light source unit UN1 to include the light source section 410 having at least the light sources 4101, 4102 and the light source cooling section 4104. In other words, in the case in which the light source unit UN1 does not include the optical element section, it is possible for the connection members CN to connect the first radiator 532 constituting the cooling unit UN3 and the light source section 410 constituting the light source unit UN1 to each other, and further, it is also possible for the connection section 63 to be disposed between the first radiator 532 and the light source section 410 in the connection members CN.

Arrangement of Constituents of Cooling Device

As described above, the first heat exchanger 521 is arranged inside the first sealed housing 511. The third heat exchanger 533 is arranged inside the second sealed housing 541. Further, the tank 522, the pump 55 and the second heat exchanger 56 are arranged at roughly center of the exterior housing 2 and in the vicinity of the image forming device 42 as shown in FIG. 1. In other words, among the constituents described above as the constituents of the cooling device 5, the configurations other than the tank 531, the first radiator 532 and the second radiator 534 constituting the third circulation channel 53 are arranged in the second area A2 described above in the space inside the exterior housing 2.

In contrast, the tank 531, the first radiator 532 and the second radiator 534 as the heat radiators are arranged inside the first area A1 thermally isolated from the second area A2 by the partition wall 27 described above. In other words, the first area A1 in which the first radiator 532 and the second radiator 534 are arranged, and the second area A2 in which the first light source 4101, the second light source 4102, and the light modulation devices 472 are arranged are partitioned from each other by the partition wall 27. Further, the first radiator 532 and the second radiator 534 are thermally isolated from the first light source 4101, the second light source 4102, and the light modulation devices 472. In the detailed description, the tank 531 is disposed at a position adjacent to the introduction port 261. Further, the first radiator 532 and the second radiator 534 are arranged along the back surface section 24. Therefore, the heat radiated to the surrounding gas by the first radiator 532 and the second radiator 534 is prevented from affecting the components inside the second area A2.

Arrangement of Fans

In addition to the configuration described above, the cooling device 5 is provided with intake fans FN1, FN2, an exhaust fan FN3, and cooling fans FN4, FN5 disposed inside the exterior housing 2 as shown in FIG. 1.

The intake fans FN1, FN2 and the exhaust fan FN3 are arranged inside the second area A2 described above. In the detailed description, the intake fans FN1, FN2 are disposed so as to correspond respectively to the introduction ports 232, 233 disposed in the front surface part 23 of the exterior housing 2, and introduce the cooling gas described above to the inside via the introduction ports 232, 233.

The cooling gas introduced by the intake fan FN1 circulates along the power supply device 9 in the −Z direction from the fan FN1 as indicated by the arrow AR1 in FIG. 1.

The cooling gas introduced by the intake fan FN2, as indicated by the arrow AR2, circulates from the fan FN2 in the −Z direction along the light source device 41, and then circulates toward the +X direction along the tank 522, the pump 55 and the second heat exchanger 56. Subsequently, the cooling gas is suctioned by the exhaust fan FN3 disposed in accordance with the discharge port 241 provided to the back surface part 24 of the exterior housing 2 together with the cooling gas having circulated along the power supply device 9, and is then discharged outside the exterior housing 2 from the discharge port 241 as indicated by the arrow AR3.

The constituents inside the area A2 are cooled by the cooling gas circulating in such a manner.

The cooling fans FN4, FN5 are disposed inside the area A1 described above. In the detailed description, the cooling fan FN4 is disposed between the discharge port 242 provided to the back surface part 24 and the first radiator 532. The cooling fan FN5 is disposed between the discharge port 242 and the second radiator 534.

When the cooling fans FN4, FN5 are driven, the gas outside the exterior housing 2 is introduced inside the first area A1 as the cooling gas via the introduction port 261 provided to the left side surface part 26 of the exterior housing 2. In other words, the introduction port 261 introduces the gas located outside the exterior housing 2 inside the first area A1 as the cooling gas due to the drive of the cooling fans FN4, FN5. The cooling gas cools the tank 531 and the third refrigerant RE3 inside the tank 531.

Further, the cooling fans FN4, FN5 circulate the cooling gas through the first radiator 532 and the second radiator 534 to cool these radiators 532, 534 in the process of suctioning the cooling gas introduced in the first area A1. In other words, the heat of the third refrigerant RE3 is transmitted to the cooling gas circulating through the radiators 532, 534 by the radiators 532, 534, and thus, the third refrigerant RE3 is cooled.

Then, the cooling gas having circulated through the radiators 532, 534 is discharged outside the exterior housing 2 from the exhaust port 242 described above by the cooling fans FN4, FN5. In other words, the discharge port 242 discharges the cooling gas having circulated through the first radiator 532 and the second radiator 534 to the outside of the exterior housing 2 due to the drive of the cooling fans FN4, FN5.

Here, as described above, although the introduction ports 232, 233 are each provided with the air filter, the introduction port 261 is not provided with the air filter.

This is because a number of components to be significantly affected by the adhesion of dust are disposed inside the second area A2 on the one hand, and components to be relatively lightly affected by the adhesion of dust are disposed inside the first area A1 on the other hand. Meanwhile, if the air filter is provided to the introduction port, the pressure loss in introducing the gas increases, and thus, the flow rate of the cooling gas introduced decreases. Taking these into consideration, in order to reduce the pressure loss to make it easy to introduce the cooling gas inside the first area A1 to thereby increase the cooling efficiency of the radiators 532, 534, the air filter is not provided to the introduction port 261 in the present embodiment.

However, this is not a limitation, and in the case in which, for example, cooling of the radiators 532, 534 can sufficiently be achieved, it is also possible to provide the air filter to the introduction port 261.

Advantages of First Embodiment

The projector 1 according to the present embodiment described hereinabove has the following advantages.

In the image projection device 4 and the cooling device 5, the light source unit UN1 for cooling the light sources 4101, 4102 with the third refrigerant RE3 (the first liquid refrigerant) and the cooling unit UN3 for cooling the second refrigerant RE2 and the third refrigerant RE3 are configured so as to detachably be attached to each other, and the optical unit UN2 for cooling the light modulation devices 472 with the second refrigerant RE2 (the second liquid refrigerant) and the cooling unit UN3 are also configured so as to detachably be attached to each other. In other words, the light source unit UN1 and the cooling unit UN3 are configured so as to detachably be attached to each other, and the optical unit UN2 and the cooling unit UN3 are configured so as to detachably be attached to each other. According to this configuration, a target unit in which necessity to be detached arises out of these units UN1 through UN3 can easily be detached from other units connected thereto. Therefore, the target unit can more easily be replaced compared to the configuration in which it is necessary to detach the whole of the image projection device 4 or the whole of the cooling device 5, and therefore, the maintainability of the projector 1 can be enhanced.

Each of the connection members CM (the second connection member) and the connection members CN (the first connection member) is provided with the plurality of connection sections 6, and the connection sections 6 (61 through 64) are each formed of the coupler CP having the male coupler CP1 connected to one of the two units as the connection targets, and the female coupler CP2 connected to the other thereof. According to this configuration, by separating each of the couplers CP in the connection sections 61, 62, it is possible to separate the optical unit UN2 and the cooling unit UN3 from each other, and further, by separating each of the couplers CP in the connection sections 63, 64, it is possible to separate the light source unit UN1 and the cooling unit UN3 from each other. Therefore, it is possible to reliably detach at least any of the units UN1 through UN3 described above from other units connected thereto.

As described above, there is provided the plurality of connection sections 6 each formed of the coupler CP. The male coupler CP1 and the female coupler CP2 constituting the coupler CP are different in shape from each other, and the male couplers CP1 cannot be coupled to each other, and the female couplers CP2 cannot be coupled to each other. According to this configuration, when detaching the unit as a replacing target or a repair target, and then attaching a new unit or the unit once detached, it is possible to prevent the unit to be attached from being attached in an opposite orientation. Therefore, misassembling of the units can be prevented.

The cooling unit UN3 has the first radiator 532 located upstream with respect to the third heat exchanger 533 in the flow channel of the third refrigerant RE3, and radiating the heat of the third refrigerant RE3 circulating through the third heat exchanger 533 to thereby cool the third refrigerant RE3. According to this configuration, it is possible to directly circulate the third refrigerant RE3 having been cooled by the first radiator 532 through the third heat exchanger 533. Therefore, it is possible to efficiently cool the third heat exchanger 533, and by extension, it is possible to efficiently cool the light diffusion device 417 and the wavelength conversion device 419 disposed inside the second sealed housing 541.

The cooling unit UN3 has the first radiator 532 and the second radiator 534 for radiating the heat of the third refrigerant RE3 as the heat radiators, and these radiators 532, 534 are thermally isolated from the light source device 41 having the light sources 4101, 4102 and the image forming device 42 having the light modulation devices 472.

Here, the deterioration of the light sources 4101, 4102 each having the solid-state light sources SS each formed of an LD and the light modulation devices 472 each having the liquid crystal panel 474 and the polarization plates 473, 475 is apt to progress as the temperature rises. Further, the LD deteriorates in emitted light intensity as the temperature rises.

In contrast, by thermally separating the radiators 532, 534, the heat radiated in the radiators 532, 534 can be prevented from being transmitted to the light sources 4101, 4102 and the light modulation devices 472. Therefore, the rise in temperature and the deterioration of these constituents can be prevented, and in addition, luminance drop of the image light can be prevented.

The exterior housing 2 for housing the device main body 3 has the partition wall 27 for partitioning the first area A1 in which the first radiator 532 and the second radiator 534 are disposed, and the second area A2 in which the light source device 41 (the light sources 4101, 4102) and the image forming device 42 (the light modulation devices 472) are disposed to thereby thermally isolate the first area A1 from the second area A2 in the inside thereof. According to this configuration, it is possible to reliably prevent the heat radiated by each of the radiators 532, 534 disposed in the first area A1 from affecting the light sources 4101, 4102 and the light modulation devices 472 disposed in the second area A2. Therefore, it is possible to surely suppress the rise in temperature of the light sources 4101, 4102 and the light modulation devices 472.

Inside the first area A1, there are disposed the cooling fans FN4, FN5 for circulating the cooling gas through the radiators 532, 534, and the exterior housing 2 has the introduction port 261 for introducing the gas located outside the exterior housing 2 into the first area A1, and the discharge port 242 for discharging the cooling gas having circulated through the radiators 532, 534 outside the exterior housing 2. According to this configuration, it is possible to circulate the gas low in temperature located outside the exterior housing 2 through the radiators 532, 534 disposed inside the first area A1 as the cooling gas. Further, since the cooling gas having circulated through the radiators 532, 534 to be raised in temperature is discharged from the discharge port 242, it is possible to keep the temperature in the first area A1 in a low level. Therefore, it is possible to increase the heat radiation efficiency by the radiators 532, 534, and thus, it is possible to effectively cool the third refrigerant RE3 using the radiators 532, 534. Therefore, it is possible to further suppress the rise in temperature of the light sources 4101, 4102 and the second refrigerant RE2 cooled by the third refrigerant RE3.

Second Embodiment

Then, a second embodiment of the invention will be described.

A projector according to the present embodiment has substantially the same configuration as that of the projector shown in the first embodiment described above, but is different from the projector 1 in the point that there is provided a connection member CNA for connecting the light source section 410 and the optical element section to each other, and having a connection section 65. It should be noted that in the description below, a part which is the same or substantially the same as the part having already been described is denoted by the same reference symbol, and the description thereof will be omitted.

Figure 7:
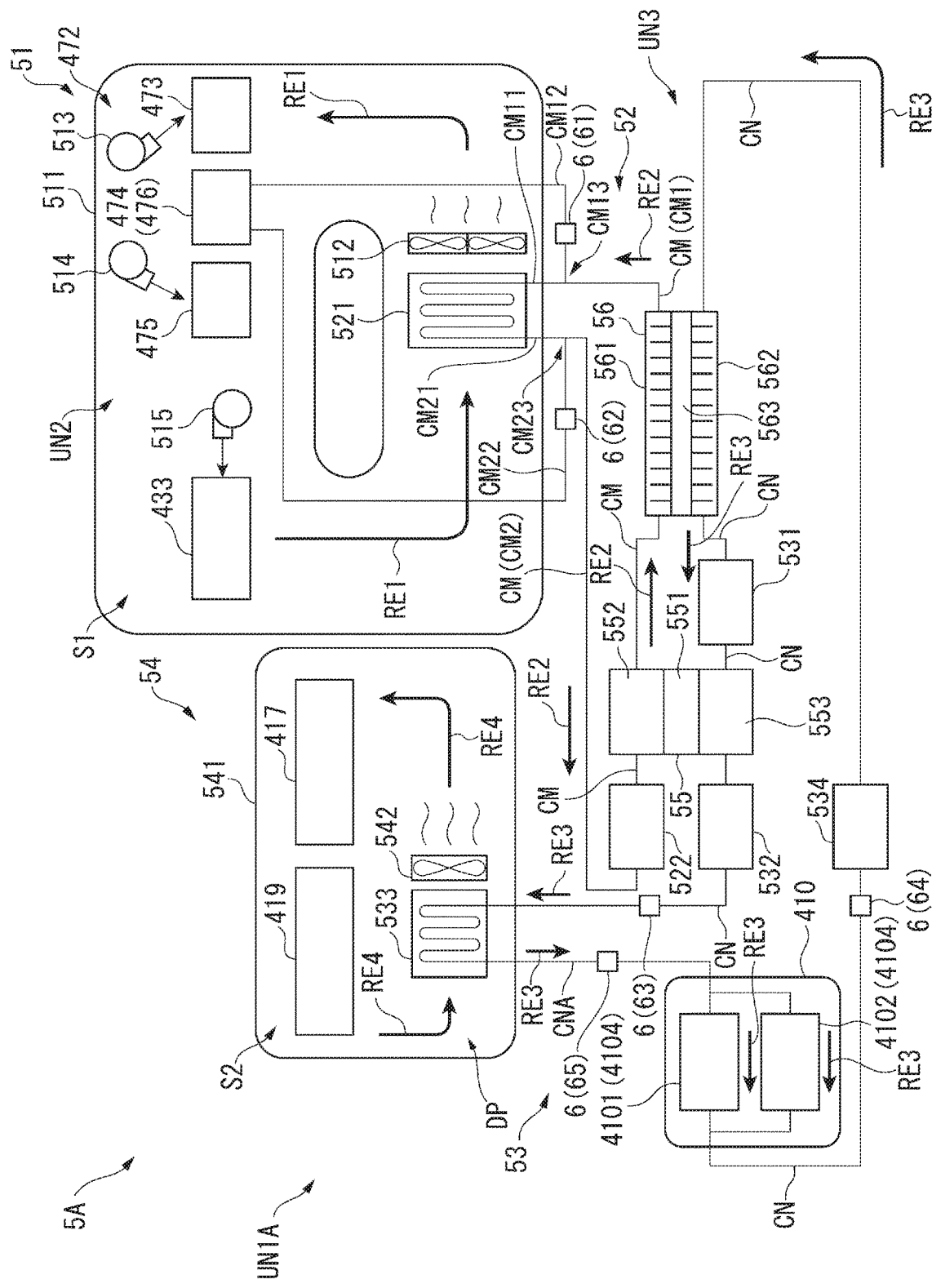
FIG. 7 is a schematic diagram showing a configuration of a cooling device provided to a projector according to a second embodiment of the invention.

FIG. 7 is a schematic diagram showing a configuration of a cooling device 5A provided to the projector according to the present embodiment.

As shown in FIG. 7, the projector according to the present embodiment has substantially the same configuration and functions as those of the projector 1 described above except the point that the cooling device 5A is provided instead of the cooling device 5.

The cooling device 5A has substantially the same configuration as the cooling device 5 shown in the first embodiment described above except the point that the connection member CNA described above is provided as the connection member for connecting the third heat exchanger 533 and the light source cooling section 4104 to each other. The connection member CNA is provided with the connection section 6 (65). Specifically, the cooling device 5A is further provided with one connection section 6 (65) provided to the connection member CNA in addition to the connection sections 6 (61 through 64) shown in the first embodiment described above. It should be noted that the connection section CNA connects the third heat exchanger 533 and the light source cooling section 4104 to each other. The connection member CNA is a tubular member through which the third refrigerant RE3 can circulate, and corresponds to the third connection member.

Further, the projector according to the present embodiment has a light source unit UN1A constituting a part of the image projection device 4 and the cooling device 5A instead of the light source unit UN1. The light source unit UN1A includes the light source section 410 and the optical element section DP, and the connection member CNA described above.

As described above, the light source section 410 has the light sources 4101, 4102, and the two light source cooling sections 4104 (the first cooling section) for respectively cooling the light sources 4101, 4102 with the third refrigerant RE3 (the first liquid refrigerant).

The optical element section DP has the optical elements such as the light diffusion element 4171 and the wavelength conversion element 4191, and the third heat exchanger 533 (the third cooling section) for cooling the light diffusion element 4171 and the wavelength conversion element 4191 with the third refrigerant RE3 (the first liquid refrigerant) via the fourth refrigerant RE4 circulating inside the second sealed housing 541.

The connection section 65 provided to the connection member CNA described above is a connection section for detachably connecting the light source section 410 and the optical component section DP to each other in the light source unit UN1A. Specifically, the connection section 65 is disposed in the connection member CNA for guiding the third refrigerant RE3 from the third heat exchanger 533 of the optical element section DP to the light source cooling sections 4104 and between the third heat exchanger 533 and the region where the third refrigerant RE3 is branched in order to circulate toward the light source cooling sections 4104. It should be noted that the connection section 65 is formed of the coupler CP (see FIG. 6) shown in the first embodiment described above.

By separating the couplers CP of such connection section 65 and the connection section 63 described above, it is possible to separate the optical element section DP of the light source unit UN1A from the cooling unit UN3. Further, by separating the couplers CP of the connection section 65 and the connection section 64 described above, it is possible to separate the light source section 410 of the light source unit UN1A from the cooling unit UN3.

Therefore, by providing the connection section 65 in addition to the connection sections 63, 64, out of the constituents of the light source device 41, each of the light source section 410 and the optical element section DP can individually be detached from the projector.

Advantages of Second Embodiment

According to the projector related to the present embodiment described hereinabove, in addition to the advantages substantially the same as those of the projector 1 described above, the following advantages can be obtained.

The light source unit UN1A has the light source section 410 including the light sources 4101, 4102 and the light source cooling sections 4104 (the first cooling section), the optical element section DP including the wavelength conversion element 4191 and the light diffusion element 4171 as the optical elements acting on the light emitted from these light sources 4101, 4102, and the third heat exchanger, and the connection member CNA for connecting the light source cooling sections 4104 and the third heat exchanger 533 to each other. Since the connection member CNA is provided with the connection section 65, the light source section 410 and the optical element section are detachably attached to each other.

According to this configuration, it is possible to detach the light source unit UN1A from the projector, and in addition, it is also possible to detach each of the light source section 410 and the optical element section individually from the projector. Therefore, it is possible to further enhance the maintainability of the projector.

The optical element in the present embodiment is at least one of the wavelength conversion element 4191 for converting the wavelength of the incident light, and the light diffusion element 4171 for diffusing the incident light. According to this configuration, even in the case in which there arises the necessity of replacing the wavelength conversion element 4191 or the light diffusion element 4171 due to the deterioration or the like, it is possible to detach and then replace at least one of these constituents. Therefore, it is possible to further enhance the maintainability of the projector.

Third Embodiment

Then, a third embodiment of the invention will be described.

A projector according to the present embodiment has substantially the same configuration as that of the projector shown in the first embodiment described above, but is different from the projector 1 in the point that there is provided another connection section at a position different from the connection sections 6 (61, 62) on the flow channel in which the second refrigerant RE2 circulates. It should be noted that in the description below, a part which is the same or substantially the same as the part having already been described is denoted by the same reference symbol, and the description thereof will be omitted.

Figure 8:
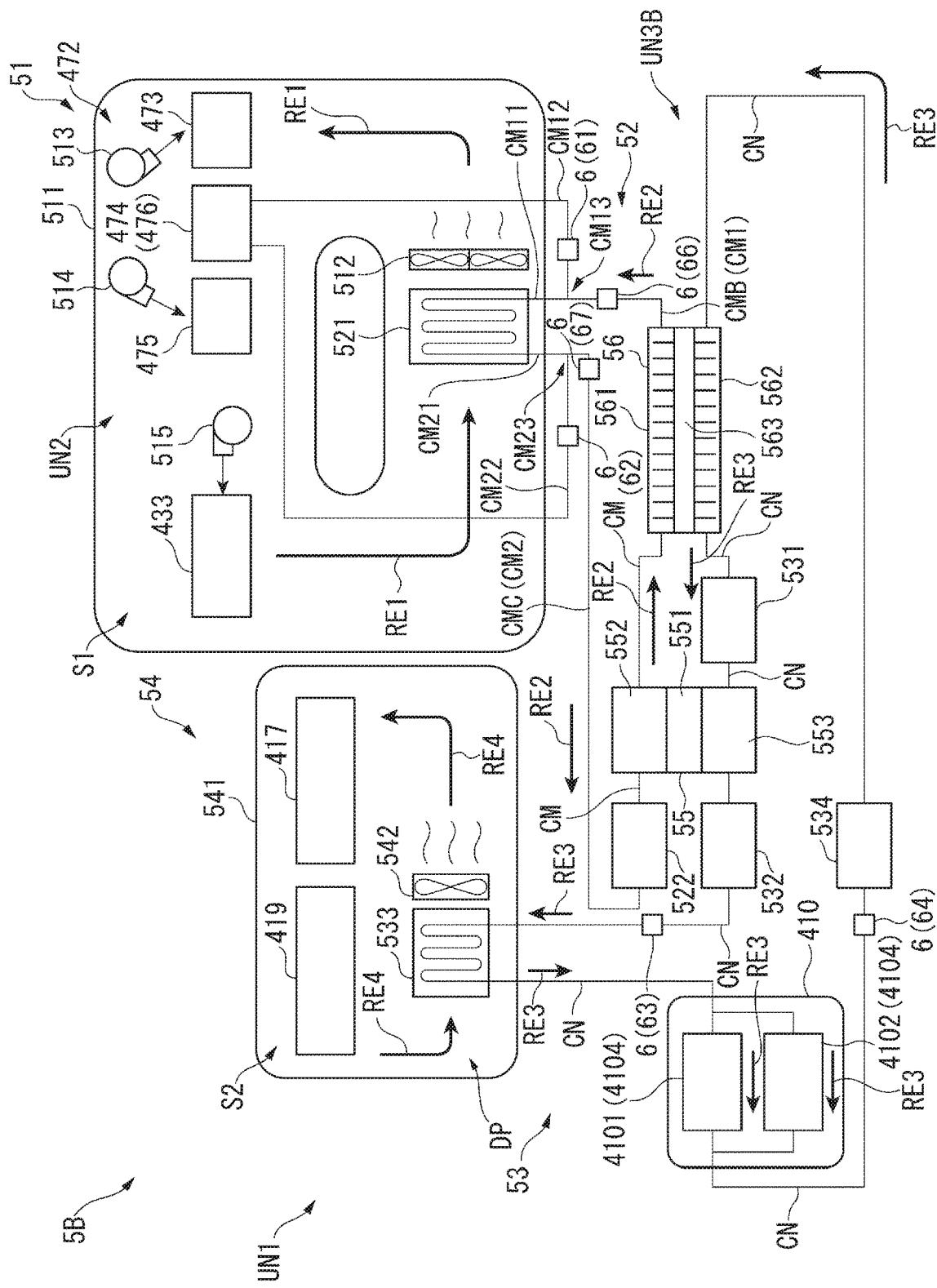
FIG. 8 is a schematic diagram showing a configuration of a cooling device provided to a projector according to a third embodiment of the invention.

FIG. 8 is a schematic diagram showing a configuration of a cooling device 5B provided to the projector according to the present embodiment.

As shown in FIG. 8, the projector according to the present embodiment has substantially the same configuration and functions as those of the projector 1 described above except the point that the cooling device 5B is provided instead of the cooling device 5.

The cooling device 5B has substantially the same configuration as the configuration of the cooling device 5, but a connection member CMB provided with the connection section 6 (66), and a connection member CMC provided with the connection section 6 (67) are adopted as a part of the connection members CM as the tubular member through which the second refrigerant RE2 can circulate. In other words, the cooling device 5B is further provided with two connection sections 6 (66, 67) in addition to the connection sections 6 (61 through 64) described above. These connection sections 66, 67 are each formed of the coupler CP (see FIG. 6) shown in the first embodiment described above.

Among these constituents, the connection section CMB connects the heat receiving section 561 of the second heat exchanger 56 and the branch part CM13 to each other. In other words, the connection member CMB constitutes an upstream side part of the second refrigerant RE2 with respect to the branch part CM13 in the connection member CM1 extending from the heat receiving section 561 of the second heat exchanger 56.

Further, the connection member CMC connects the junction part CM23 and the tank 522 to each other. In other words, the connection member CMC constitutes a downstream side part of the second refrigerant RE2 with respect to the junction part CM23 in the connection member CM2 connecting the first heat exchanger 521, the cooling sections 476 of the light modulation devices 472, and the tank 522 to each other.

It should be noted that the projector according to the present embodiment has a cooling unit UN3B constituting a part of the cooling device 5B instead of the cooling unit UN3. The cooling unit UN3B includes the connection members CMB, CMC described above in addition to the configuration of the cooling unit UN3.

The connection section 66 provided to the connection member CMB is located on the upstream side of the second refrigerant RE2 with respect to the branch part CM13. Further, the connection section 67 provided to the connection member CMC is located on the downstream side of the second refrigerant RE2 with respect to the junction part CM23. Further, these connection sections 66, 67 are disposed at regions located outside the first sealed housing 511 in the respective connection members CMB, CMC. It should be noted that also in the connection sections 66, 67, on the upstream side of the second refrigerant RE2, the male coupler CP1 is disposed, and on the downstream side, the female coupler CP2 is disposed.

By separating the couplers CP of such connection sections 66, 67, it is possible to detach the optical unit UN2 from the cooling unit UN3B. In this case, since the whole of the first sealed housing 511 can be separated from the cooling unit UN3B, it is possible to detach the whole of the image forming device 42 described above from the cooling unit UN3B. Therefore, it is possible not only to replace the constituents, but also to replace the image forming device 42 from the projector in accordance with a change in the specifications or the like.

Advantages of Third Embodiment

According to the projector related to the present embodiment described hereinabove, in addition to the advantages substantially the same as those of the projector 1 described above, the following advantages can be obtained.

The cooling unit UN3B has the connection member CMB for connecting between the branch part CM13 and the second heat exchanger 56, and the connection member CMC for connecting between the junction part CM23 and the tank 522. Further, the connection sections 66, 67 are provided to the these connection members CMB, CMC. According to this configuration, the whole of the first sealed housing 511 can be separated from the cooling unit UN3B, and it is possible to detach the whole of the image forming device 42 from the projector. Therefore, it is possible to further enhance the maintainability of the projector.

Modifications of Embodiments

The invention is not limited to the embodiments described above, but includes modifications, improvements, and so on in the range where the advantages of the invention can be achieved.

In each of the embodiments, it is assumed that the cooling devices 5, 5A, 5B include the first circulation channel 51. However, this is not a limitation, but the first circulation channel 51 can be eliminated. Specifically, it is sufficient for the projector to be provided with the light source unit including the light sources 4101, 4102 and the light source cooling sections 4104, the optical unit including the light modulation devices 472 and the cooling sections 476, and the cooling unit connected to these units via the connection members, and for cooling the second refrigerant RE2 and the third refrigerant RE3 each as the liquid refrigerant, and other constituents can be eliminated.

In each of the embodiments described above, it is assumed that the third refrigerant RE3 circulating through the light source units UN1, UN1A and the second refrigerant RE2 circulating through the optical unit UN2 are different in flow channel from each other. In other words, it is assumed that the third refrigerant RE3 circulating through the third circulation channel 53 and the second refrigerant RE2 circulating the second circulation channel 52 are not merged with each other. However, this is not a limitation, but it is also possible to dispose the light source cooling section 4104 constituting the light source units UN1, UN1A and the cooling section 476 constituting the optical unit UN2 on the same circulation channel. Even in this case, by providing the connection sections 6 at the positions across the light source cooling section 4104 from each other, and the positions across the cooling section 476 from each other in the circulation channel, it is possible to detach any one of the light source units UN1, UN1A, the optical unit UN2, and the cooling unit UN3, UN3B from other units connected thereto.

In each of the embodiments described above, it is assumed that the connection sections 6 are each formed of the coupler CP having the male coupler CP1 and the female coupler CP2, and the coupler CP is the valved coupler. However, this is not a limitation, but the coupler CP is not required to be the valved coupler, the shapes of the couplers to be combined with each other can be the same, and it is also possible to adopt couplers different between the connection sections 6. Further, it is also possible for the connection sections 6 to adopt other configurations than the coupler provided to each of the connection members. For example, it is also possible to adopt a configuration in which the pipe constituting the connection member can be separated from the cooling section such as the light source cooling section 4104 and the cooling sections 476.

Further, it is assumed that in the flow channel of the liquid refrigerant, the male coupler CP1 is located on the upstream side, and the female coupler CP2 is located downstream side. However, this is not a limitation, but either one of the male coupler CP1 and the female coupler CP2 can be located on the upstream side.

In each of the embodiments described above, it is assumed that the first radiator 532 is disposed on the upstream side with respect to the third heat exchanger 533 in the third circulation channel 53 through which the third refrigerant RE3 circulates. However, this is not a limitation, but the first radiator 532 can be eliminated providing the third refrigerant RE3 sufficiently low in temperature can be circulated through the third heat exchanger 533. Further, even in the case of providing the first radiator 532, it is also possible to dispose the first radiator 532 between the third heat exchanger 533 and the light source cooling section 4104 in the third circulation channel 53. In other words, the arrangement of the first radiator 532 can arbitrarily be changed. The same applies to the second radiator 534.

In each of the embodiments described above, it is assumed that the first radiator 532 and the second radiator 534 as the heat radiators are thermally isolated from the light sources 4101, 4102 and the light modulation devices 472. Specifically, it is assumed that the partition wall 27 for partitioning the area A1 where the radiators 532, 534 are disposed and the area A2 where the light sources 4101, 4102 and the light modulation devices 472 are disposed from each other is disposed inside the exterior housing 2 between the radiators 532, 534, and the light sources 4101, 4102 and the light modulation devices 472. However, this is not a limitation, but it is sufficient for these constituents to be disposed at positions where the heat radiated by the radiators 532, 534 does not affect the light sources 4101, 4102 and the light modulation devices 472. For example, the partition wall 27 can be eliminated, and it is also possible to partition the area where the radiators 532, 534 are disposed and the area where the light sources 4101, 4102 and the light modulation devices 472 are disposed from each other using another member as the partition wall. Further, in the case in which the radiators 532, 534 are disposed in the downstream-most area of the cooling gas taken in from the outside of the exterior housing 2 in the first area A1, the arrangement of the light sources 4101, 4102 and the light modulation devices 472 can arbitrarily be changed. Further, the tank 531 can be disposed in the second area A2.

In each of the embodiments described above, it is assumed that the cooling gas taken in from the outside of the exterior housing 2 through the introduction port 261 opening in the first area A1 circulates in the first area A1 where the first radiator 532 and the second radiator 534 are disposed, and the cooling gas having circulated through the radiators 532, 534 is discharged outside the exterior housing 2 via the discharge port 242 similarly opening in the first area A1. However, this is not a limitation, but it is also possible to adopt a configuration in which, for example, the cooling gas having circulated in the second area A2, or the cooling gas having circulated through other cooling targets circulates through the radiators 532, 534. It should be noted that it goes without saying that the cooling efficiency of the third refrigerant RE3 by the radiators 532, 534 is high in the case of circulating the cooling gas relatively low in temperature located outside the exterior housing 2 through the radiators 532, 534.

In each of the embodiments described above, it is assumed that the connection sections 6 are disposed at the positions where the light source units UN1, UN1A, the optical unit UN2 and the cooling units UN3, UN3B can be separated from each other. Further, it is assumed that the 4 connection sections 6 are provided in the first embodiment described above, the 5 connection sections 6 are provided in the second embodiment, and the 6 connection sections 6 are provided in the third embodiment. However, this is not a limitation, but it is also possible to provide a larger number of connection sections 6. For example, it is also possible to dispose the connection sections 6 so that the first light source 4101 and the light source cooling section 4104 can individually be detached, and the second light source 4102 and the light source cooling section 4104 can also individually be detached. As the positions of such connection sections 6, there can be cited the positions across the light source cooling section 4104 provided to the first light source 4101 from each other in the third circulation channel 53, and the positions across the light source cooling section 4104 provided to the second light source 4102 from each other.

Further, the configuration shown in each of the embodiments can be combined with each other. For example, it is possible to combine the configurations of the cooling devices 5A, 5B to make the light source unit UN1A and the cooling unit UN3B be detachably attached to each other, and then make the optical unit UN2 and the cooling unit UN3B be detachably attached to each other, and further, make the light source section 410 and the optical element section DP in the light source unit UN1A be separated from each other, and further, configure the image forming device 42 so as to be able to be separated from the cooling unit UN3B.

In each of the embodiments described above, it is assumed that the pump for pressure-feeding to circulate the second refrigerant RE2 through the second circulation channel 52, and the pump for pressure-feeding to circulate the third refrigerant RE3 through the third circulation channel 53 are the same pump 55. However, this is not a limitation, but it is also possible to individually provide the pump for pressure-feeding the second refrigerant RE2 and the pump for pressure-feeding the third refrigerant RE3 instead of the pump 55.

In each of the embodiments described above, it is assumed that the projector is equipped with the three light modulation devices 472 (472R, 472G, and 472B). However, this is not a limitation, and the invention can also be applied to a projector equipped with two or less, or four or more light modulation devices.

In each of the embodiments described above, it is assumed that the image projection device 4 has the configuration and the layout shown in FIG. 2, but the configuration and the layout of the image projection device 4 can arbitrarily be changed.

In each of the embodiments described above, it is assumed that the light modulation devices 472 are each provided with the transmissive type liquid crystal panel 474 having the plane of incidence of light and the light exit surface different from each other. However, this is not a limitation, but it is also possible to adopt a configuration in which the light modulation device each have a reflective type liquid crystal panel having the plane of incidence of light and the light exit surface coinciding with each other. Further, it is also possible to use a light modulation device other than the liquid crystal, such as a device using a micro mirror device like a digital micromirror device (DMD) providing the light modulation device is capable of modulating the incident light beam to form the image corresponding to the image information.

In each of the embodiments described above, it is assumed that the light source device 41 is provided with the first light source 4101 and the second light source 4102 each having the solid-state light source array SA having the plurality of solid-state light sources SS each formed of an LD arranged in an array. However, this is not a limitation, but it is also possible to make the light source device provided with a configuration having a light source lamp. Further, it is also possible to adopt a configuration provided with other solid-state light sources such as LED (light emitting diode) instead of the solid-state light sources SS described above.

The entire disclosure of Japanese Patent Application No. 2017-202023, filed Oct. 18, 2017 is expressly incorporated by reference herein.

What is claimed is:

1. A projector comprising:
  a light source unit including a light source configured to emit light and a first cooling section configured to transmit heat from the light source to a first liquid refrigerant circulating inside the first cooling section so as to cool the light source;
  an optical unit including a light modulation device configured to modulate the light emitted from the light source and a second cooling section configured to transmit heat from the light modulation device to a second liquid refrigerant circulating inside the second cooling section so as to cool the light modulation device;
  a cooling unit configured to cool the first liquid refrigerant and the second liquid refrigerant;
  a first connection member configured to connect the light source unit to the cooling unit and to have the first liquid refrigerant circulate within; and
  a second connection member configured to connect the optical unit to the cooling unit and to have the second liquid refrigerant circulate within,
  wherein at least one of a first set of the light source unit and the cooling unit, and a second set of the optical unit and the cooling unit is detachably attached to each other.

2. The projector according to claim 1, wherein at least one of the first connection member and the second connection member includes:
  a first connection section connected to a first unit of the two units connected to each other with the at least one of the connection members, and
  a second connection section connected to a second unit of the two units, the second connection section being detachably attached to the first connection section.

3. The projector according to claim 2, wherein:
  the at least one of the first connection member and the second connection member has a plurality of connection sets of the first connection section and the second connection section, and
  a shape of each first connection section is different from a shape of each second connection section of each connection set.

4. The projector according to claim 1, wherein:
  the light source unit includes:
    a light source section including the light source and the first cooling section,
    an optical element section including (i) an optical element configured to act on the light emitted from the light source, and (ii) a third cooling section configured to transmit heat from the optical element to the first liquid refrigerant, which circulates inside the third cooling section, so as to cool the optical element, and
    a third connection member configured to connect the first cooling section to the third cooling section, the first liquid refrigerant circulating through the third connection member, and
  the light source section and the optical element section are configured to be detachably attached to each other.

5. The projector according to claim 4, wherein the cooling unit has a radiator disposed upstream with respect to the optical element section in a flow channel of the first liquid refrigerant, the radiator being configured to radiate the heat of the first liquid refrigerant before the first liquid refrigerant is circulated through the optical element section.

6. The projector according to claim 4, wherein the optical element is at least one of a wavelength conversion element configured to convert wavelength of an incident light, and a light diffusion element configured to diffuse the incident light.

7. The projector according to claim 1, wherein:
  the cooling unit has a heat radiator configured to radiate the heat of the first liquid refrigerant, and
  the heat radiator is thermally isolated from the light source and the light modulation device.

8. The projector according to claim 7, further comprising:
  an exterior housing configured to contain the light source unit, the optical unit, and the cooling unit, the exterior housing having a partition wall disposed inside the exterior housing, the partition wall dividing a first area where the heat radiator is disposed from a second area where the light source and the light modulation device are disposed, and the partition wall is configured to thermally isolate the first area from the second area.

9. The projector according to claim 8, further comprising:
  a cooling fan disposed inside the first area, the cooling fan being configured to circulate a cooling gas through the heat radiator,
  wherein the exterior housing includes:
    an introduction port configured to introduce a gas from outside of the exterior housing into the first area as the cooling gas, and
    a discharge port configured to discharge the cooling gas to the outside of the exterior housing after the gas has circulated through the heat radiator.

* * * * *